United States Patent
Oishi et al.

(10) Patent No.: US 7,760,674 B2
(45) Date of Patent: *Jul. 20, 2010

(54) METHOD OF TRANSLATING PROTOCOL AT TRANSLATOR, METHOD OF PROVIDING PROTOCOL TRANSLATION INFORMATION AT TRANSLATION SERVER, AND ADDRESS TRANSLATION SERVER

(75) Inventors: Takumi Oishi, Yokohama (JP); Hidenori Inouchi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 771 days.

This patent is subject to a terminal disclaimer.

(21) Appl. No.: 11/114,206

(22) Filed: Apr. 22, 2005

(65) Prior Publication Data
US 2005/0190790 A1 Sep. 1, 2005

Related U.S. Application Data

(63) Continuation of application No. 09/928,485, filed on Aug. 14, 2001, now Pat. No. 7,305,480.

(30) Foreign Application Priority Data
Apr. 18, 2001 (JP) ............... 2001-119036

(51) Int. Cl.
*H04B 7/00* (2006.01)
*H04J 3/22* (2006.01)
*H04W 4/00* (2009.01)

(52) U.S. Cl. ............... 370/310; 370/466; 455/432.2; 455/433

(58) Field of Classification Search ......... 370/464–467, 370/310, 313, 328, 329, 338, 349, 400, 401; 455/403, 422.1, 432.1, 432.2, 433, 435.1
See application file for complete search history.

(56) References Cited

U.S. PATENT DOCUMENTS 5,940,478 A 8/1999 Vaudreuil et al.

(Continued)

FOREIGN PATENT DOCUMENTS

EP 0 840 482 A1 10/1997

(Continued)

OTHER PUBLICATIONS

European Search Report dated Apr. 7, 2004, in English.

(Continued)

*Primary Examiner*—Aung S Moe
*Assistant Examiner*—Kerri M Rose
(74) *Attorney, Agent, or Firm*—Stites & Harbison PLLC; Juan Carlos A. Marquez, Esq.

(57) ABSTRACT

A translator is connected to a first network for transferring data in a first protocol, to a second network for transferring data in a second protocol, and to a translation server to which other translators are connected, for retaining translation information for a protocol translation between the first protocol and the second protocol. The translator generates a second address in the first protocol corresponding to a first address in the second protocol provided to a terminal accommodated in the second network. It retains a correspondence between the first address and the second address as the translation information and registers the correspondence at the translation server.

8 Claims, 47 Drawing Sheets

U.S. PATENT DOCUMENTS

| | | | |
|---|---|---|---|
| 6,055,236 | A | 4/2000 | Nessett et al. |
| 6,058,431 | A | 5/2000 | Srisuresh et al. |
| 6,128,664 | A | 10/2000 | Yanagidate et al. |
| 6,130,892 | A * | 10/2000 | Short et al. .................. 370/466 |
| 6,172,986 | B1 * | 1/2001 | Watanuki et al. ............ 370/466 |
| 6,331,984 | B1 | 12/2001 | Luciani |
| 6,353,614 | B1 | 3/2002 | Borella et al. |
| 6,385,195 | B2 | 5/2002 | Sicher et al. |
| 6,418,476 | B1 | 7/2002 | Luciani |
| 6,434,627 | B1 | 8/2002 | Millet et al. |
| 6,496,867 | B1 | 12/2002 | Beser et al. |
| 6,590,885 | B1 | 7/2003 | Jorgensen |
| 6,671,735 | B1 | 12/2003 | Bender |
| 6,697,354 | B1 | 2/2004 | Borella et al. |
| 6,708,219 | B1 | 3/2004 | Borella et al. |
| 6,768,743 | B1 | 7/2004 | Borella et al. |
| 6,781,982 | B1 | 8/2004 | Borella et al. |
| 6,785,730 | B1 | 8/2004 | Taylor |
| 6,822,957 | B1 | 11/2004 | Schuster et al. |
| 6,845,094 | B1 * | 1/2005 | Zhang ........................ 370/349 |
| 6,862,274 | B1 * | 3/2005 | Tsao et al. .................. 370/466 |
| 6,888,837 | B1 | 5/2005 | Cunningham et al. |
| 6,892,245 | B1 | 5/2005 | Crump et al. |
| 6,996,076 | B1 * | 2/2006 | Forbes et al. ................ 370/466 |
| 2002/0099854 | A1 | 7/2002 | Jorgensen |
| 2005/0190790 | A1 | 9/2005 | Oishi et al. |

FOREIGN PATENT DOCUMENTS

| | | | |
|---|---|---|---|
| EP | 0840482 | * | 6/1998 |

OTHER PUBLICATIONS

Tsuchiya et al, "Extending the IP Internet Through Address Reuse", Computer Communication Review, XP-002075152, pp. 16-33.

Tsirtsis & Srisuresh, Standards Track, Memo to Network Working Group re Network Address Translation—Protocol Translation (pp. 1-2, 6-18).

Nordmark, Standards Track, Memo to Network Working Group re Stateless IP/ICMP Translation Algorithm (SIIT), (pp. 1-2, 9-22).

H. Kitamura, A SOCKS-based IPv6/IPv4 Gateway, Memo /Internet Draft re A SOCKS-based IPv6/IPv4 Gateway Mechanism, pp. 1-10.

Request for Comments, Internet RFC Dictionary, Nov. 1, 1998, 324-337.

Johnson and Perkins, Memo/Internet Draft re: Mobility Support in IPv6, Nov. 17, 2000, pp. 2-4, 9-11, 87-89.

Johnson and Perkins, Memo/Internet Draft re: Route Optimization in Mobile IP,Nov. 15, 2000, pp. 1-4.

Perkins, Standards Track, Memo to Network Working Group re IP Mobility Support, Oct. 1996, (pp. 1-3, 24-32).

Srisuresh, P. et al, "DNS Extensionis to Network Address Translators (DNS_ALG)," RFC 2694, Sep. 1999, http://www.ietf. org/rfc/rfc2694.txt?number=2694.

Tsirtsis, G. et al., "Network Address Translation—Protocol Translation (NAT-PT)", RFC 2766, http://www.ietf.org/rfc/rfc2766.txt, (Feb. 2000), pp. 1,2,4,7 and 9.

Charles E. Perkins et al., "Mobility Support in IPv6", Mobile Computing and Networking, (Nov. 1996), pp. 27-37.

Erik Nordmark, "Stateless IP/ICMP Translator (SIIT)", Sun Microsystems, Internet Draft, http://www.ietf.org/proceedings/98dec/I-D/draft-ietf-ngtrans-siit-03.txt, (Nov. 10, 1998).

Sirsuresh, P. et al., "DNS Extensions to Network Address Translators (DNS_ALG)", http://www.ietf.org/rfc/rfc2694.txt, (Sep. 1999).

* cited by examiner

FIG.22

| # | SOURCE IP ADDRESS | VIRTUAL SOURCE IP ADDRESS | DESTINATION IP ADDRESS | VIRTUAL DESTINATION IP ADDRESS | LIFETIME OF ENTRY | SOURCE PORT NUMBER | DESTINATION PORT NUMBER | CARE OF ADDRESS |
|---|---|---|---|---|---|---|---|---|
| 1 | t6 | l4 | r4 | s6 | 600 | 2023 | 21 | — |
| 2 | . | . | . | . | . | . | . | . |
| 3 | . | . | . | . | . | . | . | . |
| 4 | t6 | m4 | r4 | s6 | 600 | 2023 | 21 | q6 |

FIG.23

| # | NAME | SOURCE IP ADDRESS | VIRTUAL SOURCE IP ADDRESS | ADDRESS CORRESPONDING TO NAME, AND DESTINATION ADDRESS | VIRTUAL DESTINATION IP ADDRESS | LIFETIME OF ENTRY | SOURCE PORT NUMBER | DESTINATION PORT NUMBER | CARE OF ADDRESS |
|---|---|---|---|---|---|---|---|---|---|
| 1 | R | t6 | l4 | r4 | s6 | 600 | 2023 | 21 | q6 |
| 2 | . | . | . | . | . | . | . | . | . |
| 3 | . | . | . | . | . | . | . | . | . |
|  |  |  |  |  |  |  |  |  |  |
| n | R | p6 | TBD | r4 | TBD | TBD | TBD | TBD |  |

IPv4 packet format stored in IPv4 payload (see fig.46)

mobile IPv4 registration request message format stored in IPv4 payload (see fig.46)

mobile IPv4 registration reply message format

IPv6 packet format stored in IPv6 extension header (see fig.49)

IPv6 destination options header message format stored in option of IPv6 extension header (see fig.50)

Mobile IPv6 binding update message format stored in options of IPv6 extension header (see fig.50)

Mobile IPv6 binding acknowledge message format stored in options of IPv6 extension header (see fig.50)

Mobile IPv6 binding request message format stored in payload of IPv4 or IPv6 packet (see fig.46 and 49)

DNS query message format stored in payload of IPv4 or IPv6 packet (see fig.46 and 49)

DNS response message format details of header part in Figs.. 54-55

DNS header part message format
(common to query and response)

DNS query part, in FIG.54 message format

DNS response part message format
(common to R1,R2 and R3 in FIG.55)

translation information register
message format stored in payload of IPv4 or IPv6
packet (see fig.46 and 49)

translation information query
massage format stored in payload of IPv4 or IPv6
packet (see fig.46 and 49)

translation information response
message format message format of header part of
translation information register message details of header part in Figs.. 60-61 message format of header part of
translation information query and translation information query part,
in FIG.60, message format message format (common to
R1,R2 and R3 in FIG.61)

METHOD OF TRANSLATING PROTOCOL AT TRANSLATOR, METHOD OF PROVIDING PROTOCOL TRANSLATION INFORMATION AT TRANSLATION SERVER, AND ADDRESS TRANSLATION SERVER

This application is a Continuation of nonprovisional application Ser. No. 09/928,485 filed on Aug. 14, 2001 now U.S. Pat. No. 7,305,480. Priority is claimed based on U.S. application Ser. No. 09/928,485 filed on Aug. 14, 2001, which claims the priority of Japanese Application No. 2001-119036, filed on Apr. 18, 2001.

BACKGROUND OF THE INVENTION

The present invention relates to a method of and a system for translating addresses between an Internet Protocol Version 4 (IPv4) address and an Internet Protocol Version 6 (IPv6) address.

There are known NAT-PT, etc. as a method of connecting a network using an Internet Protocol version 4 protocol (hereinafter, referred to as an Ipv4 network) with a network using an Internet Protocol version 6 protocol (hereinafter, referred to as an Ipv6 network).

Both of them are basically used to translate formats of IP packets mutually between IPv4 and IPv6. For example, they are used for a translation between an IPv4 address and an IPv6 address. Hereinafter, an apparatus for performing this translation is referred to as a translator. The translator needs to retain a correspondence between the IPv4 address and the IPv6 address. If this correspondence is dynamically generated whenever a communication occurs, name resolving of a domain name system (DNS) is used as a clue to the generation (refer to the Internet RFC Dictionary published by ASCII, pp. 323-329).

The DNS is a system for translating a name (a character string) easy to understand for human beings such as a URL on the Web to an IP address. Hereinafter, an operation of translating a name to an IP address is referred to as name resolving. Today, the DNS is used in almost all of the applications on the Internet to acquire an IP address of a correspondent terminal.

The translator always monitors a DNS message exchanged at initiating a communication so as to make a name resolving request message a clue to generating translation information (a correspondence of an IP address, etc.). Specifically, if an IPv4 address is a response to name resolving performed by an IPv6 terminal for a certain name, this IPv4 address is rewritten to an IPv6 address and then returned to an IPv6 terminal. Subsequently the IPv4 not rewritten is associated with the IPv6 address which has been rewritten. In other words, a response message for name resolving is snatched and rewritten and then translation information is generated based on the information before and after the rewriting. The translation information dynamically generated in this operation is temporary and therefore it is discarded after an end of the communication.

In the above prior art, the terminal is not assumed to move and therefore the correspondence between the IPv4 address and the IPv6 address is managed only inside the translator, and thus the correspondence is not exchanged among a plurality of translators.

Each translator has a certain service area, thereby disabling different translators to exchange a correspondence between an IPv4 address and an IPv6 address of each device. Therefore, a communication is interrupted if a terminal taking a translation service moves across service areas of the translators.

In addition, as already described above, the correspondence between the IPv4 address and the IPv6 address is discarded at an end of the communication and a different correspondence is used for each communication. In other words, a content to be rewritten in a response message for name resolving changes for every communication. Therefore, from the viewpoint of a terminal which has requested the name resolving, the terminal acquires different IP addresses for the same name. While the DNS generally has a cache function of storing an IP address for a certain period regarding a name for which name resolving is once performed, an IP address for the name changes whenever name resolving is performed in the conventional protocol translation method, and therefore the cache function cannot be used.

SUMMARY OF THE INVENTION

Therefore, it is an object of the present invention to provide a method of enabling a communication to be continued without any interruption even if one or both of terminals move if a protocol translation is necessary at a junction of both networks due to a difference between protocols of these networks accommodating one and the other terminals. It is another object of the present invention to provide a method of enabling a DNS cache function in name resolving with a DNS to be a clue to dynamically generating translation information necessary for translating a protocol.

In accordance with a first aspect of the present invention, there is provided a method of translating protocols at a translator, which is connected to a first network for transferring data in a first protocol, to a second network for transferring data in a second protocol, and to a translation server to which other translators are connected, for retaining translation information for a protocol translation between the first protocol and the second protocol. The translator detects an address query of a terminal accommodated in the second network from a first mobile terminal accommodated in the first network and then generates a second address in the first protocol corresponding to a first address in the second protocol provided to the terminal. In addition, it retains a correspondence between the first address and the second address as the translation information and registers the correspondence between the first address and the second address at the translation server.

Upon receiving a packet having the second address as a destination IP address from the second mobile terminal at the address in the first protocol in which a source IP address is provided to the second mobile terminal as a result of a movement of the second mobile terminal which has been communicating with the terminal via other translators in the above, the translator inquires the translation server about address information of the terminal. The translator receives the correspondence between the first address and the second address registered by other translators in the above from the server and rewrites the destination IP address to the first address. It transmits the rewritten packet to the terminal.

In accordance with another aspect of the present invention, there is provided an address translation server connected to a first network for transferring data in a first protocol, which retains a name of a terminal accommodated in a second network for transferring data in the first protocol, an address in a second protocol corresponding to the name, and a table for containing a correspondence with an address in the first protocol generated correspondingly to the above address.

The address translation server transmits the address in the first protocol to the terminal upon receiving an address query to the name from a terminal accommodated in the first network.

Other features of the present invention besides those discussed above will become apparent from the following detailed description.

BRIEF DESCRIPTION OF THE DRAWINGS

FIG. 22 is a diagram of assistance in explaining an embodiment of a translation table 101;

FIG. 23 is a diagram of assistance in explaining an embodiment of translation information retained in the translation server with the DNS server according to the present invention;

DETAILED DESCRIPTION OF THE EMBODIMENTS

Figure 1:
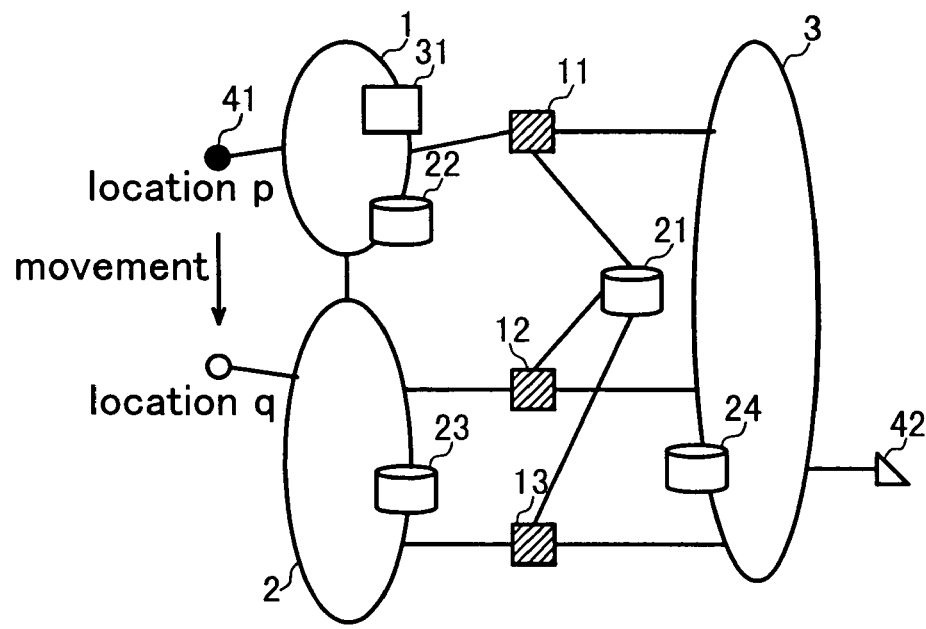
FIG. 1 is a diagram of assistance in explaining a configuration of a network in which an IPv6 network is connected to an IPv4 network.

Referring to FIG. 1, there is shown a diagram of assistance in explaining a configuration of a network in which an IPv6 network is connected to an IPv4 network. A network 1 and a network 2 belong to the IPv6 network and a network 3 belongs to the IPv4network. The network 1 is a home network of the IPv6 mobile terminal 41. If the mobile terminal 41 moves to a position q, the network 2 is a foreign network of the mobile terminal 41. Hereinafter, the network 1, the network 2, and the network 3 are referred to as a home network, a foreign network, and an IPv4 network, respectively. In FIG. 1, there are shown translators 11, 12, and 13, a translation server 21, DNS servers 22, 23, and 24, a home agent (HA) 31, and an IPv4 terminal 42. The DNS servers 22 and 23 and the translators 11, 12, and 13 can communicate with each other both in the IPv4 and the IPv6, each having an IPv4 address and an IPv6 address. The translation server 21 and the DNS server 24 are given IPv4 addresses and the home agent 31 is given an IPv6 address. The translators 11, 12, and 13 have their service areas. For example, a service to a terminal in a position p is provided by the translator 11 and a service to a terminal in the position q is provided by the translator 12.

Figure 19:
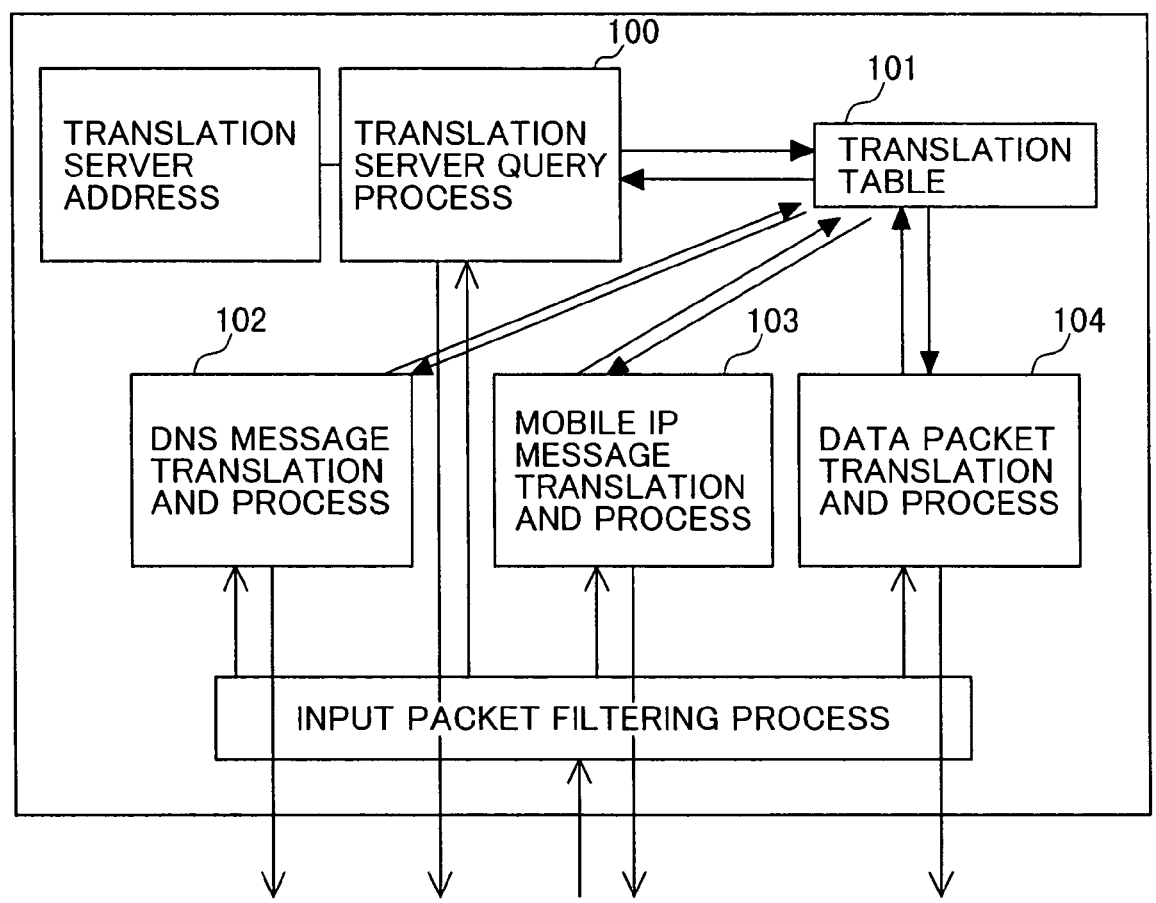
FIG. 19 is a block diagram of assistance in explaining an embodiment of a translator according to the present invention.

An embodiment of the translators 11, 12, and 13 is shown in FIG. 19. Referring to FIG. 19, there is shown a functional block diagram of the translator. The translator has a processor, a storage device, and a communication controller for a connection to a network as hardware, though they are not shown. An input packet filtering process, a translation server query process 100, a DNS message translation and process 102, a Mobile IP message translation and process 103, and a data packet translation and process 104 are made of software and executed by the processor. They can be made of hardware. A translation table 101 and a translation server address are retained in a storage device. In the input packet filtering process, input packets are distributed to the translation server query process 100, the DNS message translation and process 102, and the Mobile IP message translation and process 103 and the data packet translation and process 104. Referring to FIG. 22, there is shown an embodiment of the translation table 101. The translation table 101 and other processes performed by the translators are described later.

Figure 20:
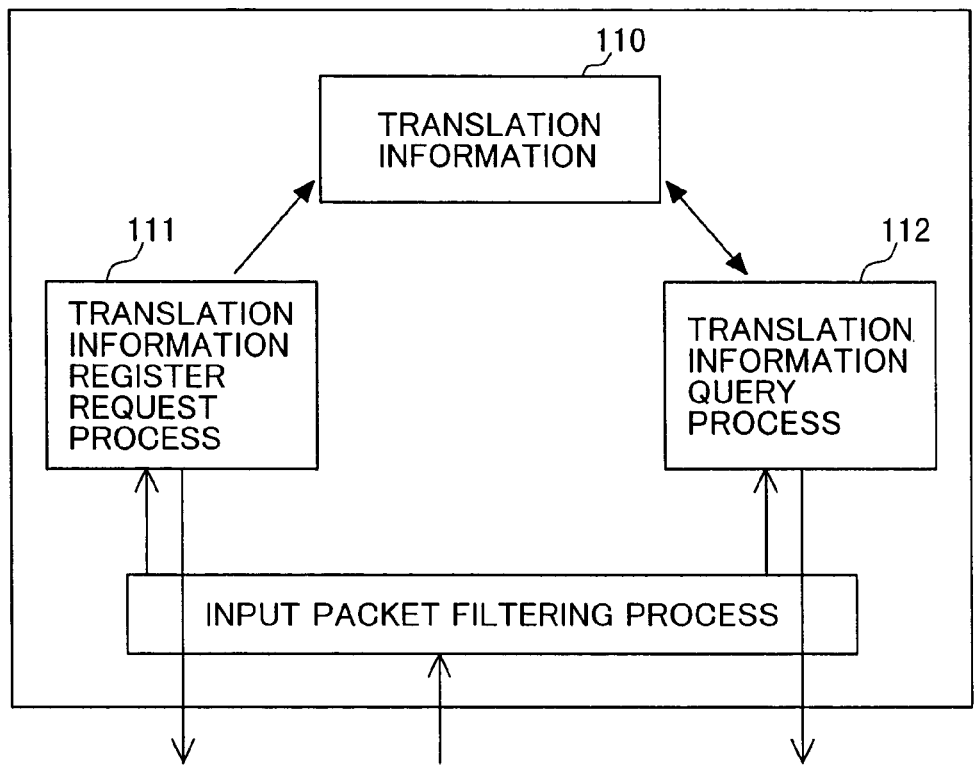
FIG. 20 is a block diagram of assistance in explaining an embodiment of a translation server according to the present invention.

Referring to FIG. 20, there is shown an embodiment of the translation server 21. FIG. 20 shows a functional block diagram of the translation server. The translation server 21 has a processor, a storage device, and a communication controller for a connection to a network as hardware, though they are not shown. An input packet filtering process, a translation information register request process 111, and a translation information query process 112 are made of software and executed by the processor. They can be made of hardware. Translation information 110 is retained in the storage device. In the input packet filtering process, input packets are distributed to the translation information register request process 111 and the translation information query process 112. The translation information 110 is a collection of contents of the translation table 100 retained in each translator, and items to be entered in the table are the same as those of the translation table 101 shown in FIG. 22. Therefore, the table for the translation information 110 is not shown. A registration method of the translation information 110 and other processes performed by the translation server 21 are described later.

The DNS servers 22, 23, and 24 have the same configurations as those of the prior arts.

Figure 2:
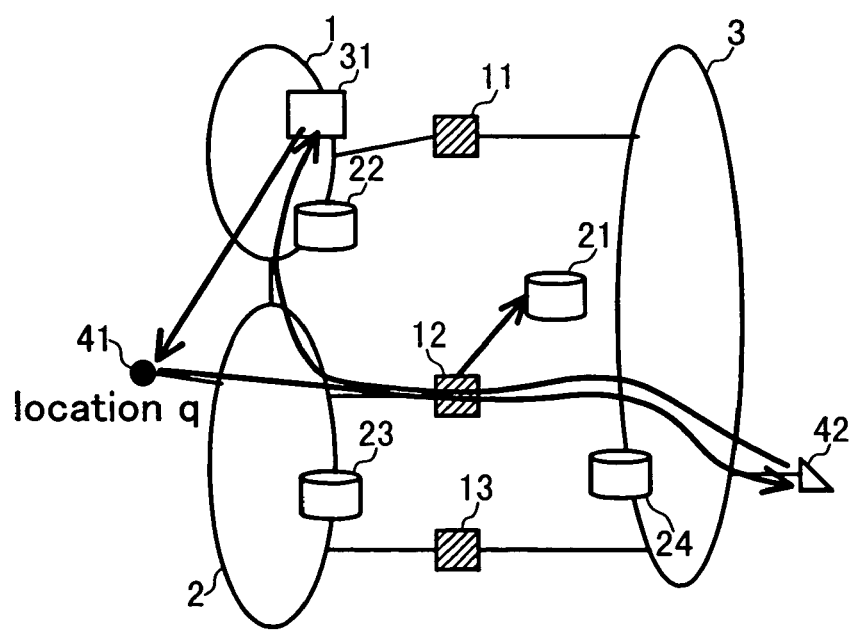
FIG. 2 is a diagram of assistance in explaining a communication route selected if the IPv6 mobile terminal initiates a communication in a foreign network.
Figure 3:
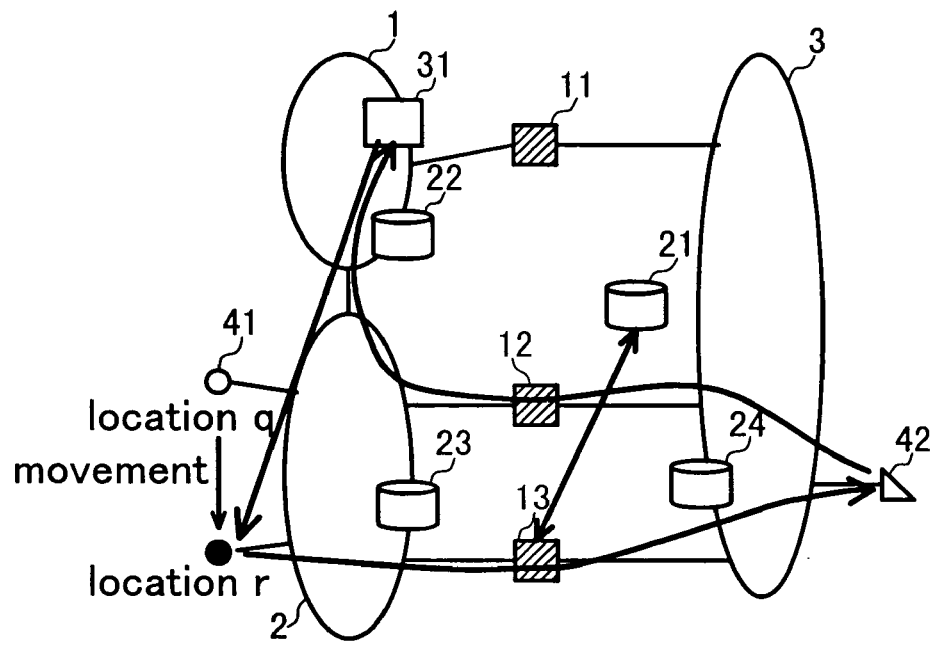
FIG. 3 is a diagram of assistance in explaining a communication route selected if the IPv6 mobile terminal moves from the location shown in FIG. 2.
Figure 4:
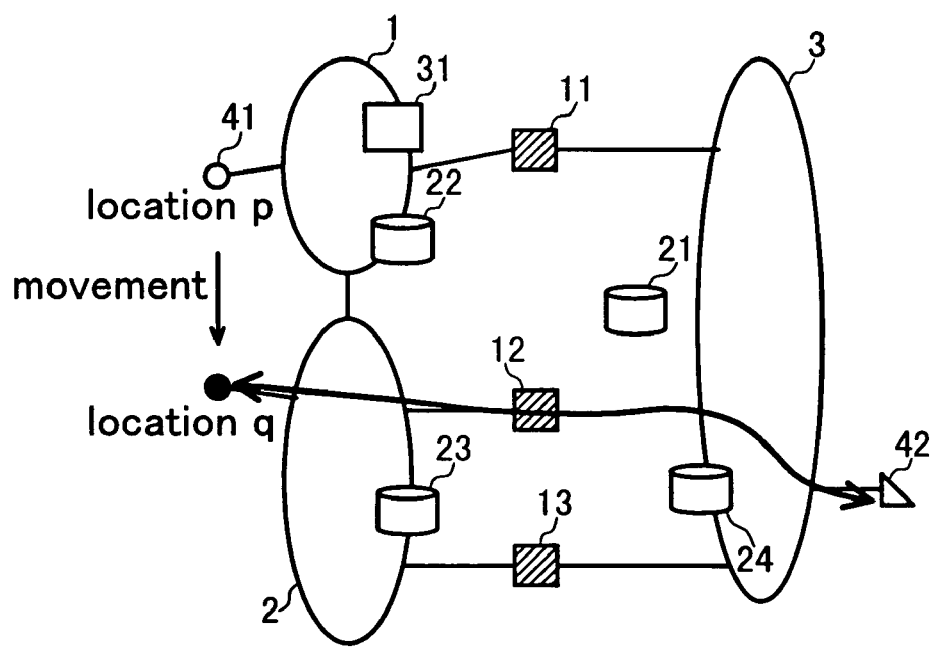
FIG. 4 is a diagram of assistance in explaining a communication route selected if the IPv6 mobile terminal moves from a home network to a foreign network and performs a route optimization or if the IPv6 mobile terminal initiates a communication in the foreign network and then performs a route optimization.
Figure 5:
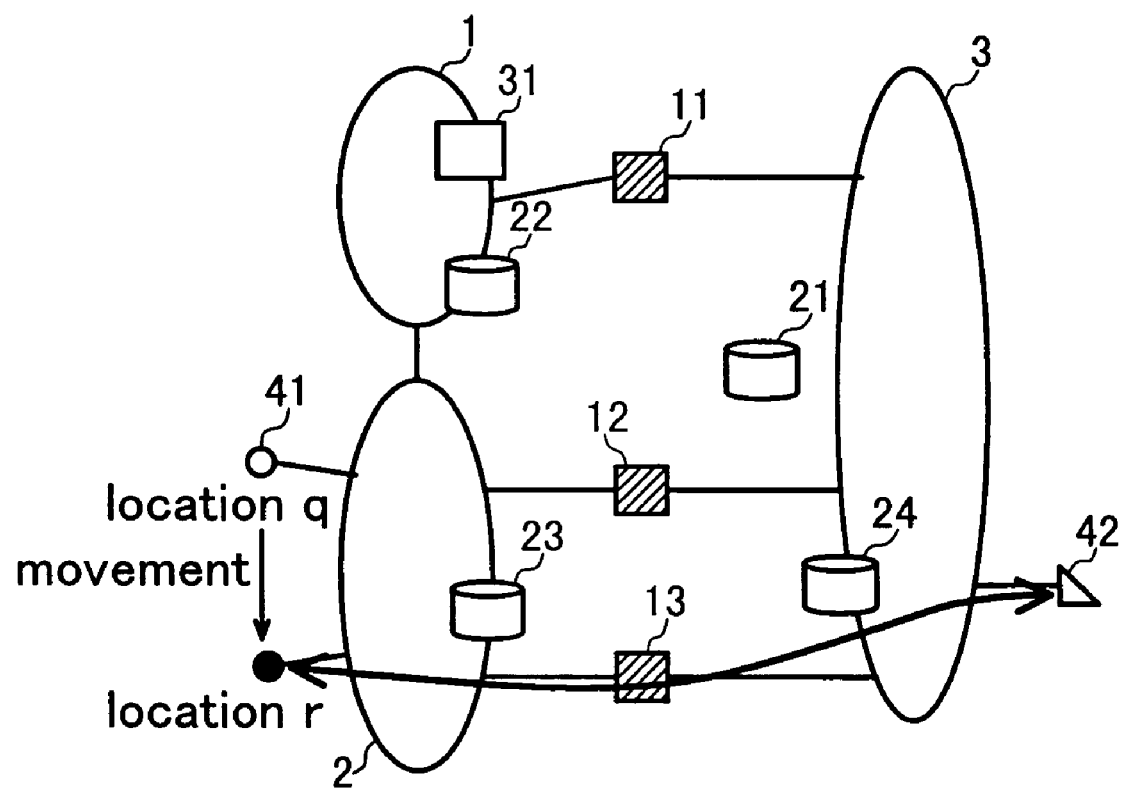
FIG. 5 is a diagram of assistance in explaining a communication route selected if the IPv6 mobile terminal further moves after the route optimization shown in FIG. 4.

Referring to FIG. 2, there is shown a communication route selected if the mobile terminal 41 initiates a communication with the IPv4 terminal 42 in a foreign network 2. A packet destined for the terminal 42 transmitted from the terminal 41 reaches the terminal 42 via the translator 12. On the other hand, a packet destined for the terminal 41 transmitted from the terminal 42 is transmitted to the terminal 41 via the translator 12 and the home agent 31. Since a home address (a care of address if the terminal 41 moves to the foreign network) of the mobile terminal 41 is registered at the home agent 31, the packet destined for the terminal 41 transmitted from the terminal 42 always passes through the home agent except when a route optimization is performed as described later. Referring to FIG. 3, there is shown a communication route selected if the mobile terminal 42 moves from the position q to a position r. The packet destined for the terminal 42 transmitted from the terminal 41 reaches the terminal 42 via the translator 13. On the other hand, the packet destined for the terminal 41 transmitted from the terminal 42 is transmitted to the terminal 41 via the translator 13 and the home agent 31. FIGS. 4 and 5 illustrate communication routes selected after a communication route optimization performed in the conditions shown in FIGS. 2 and 3, respectively. After the communication route optimization, the packet destined for the terminal 41 transmitted from the terminal 42 reaches the terminal 41 bypassing the home agent 31. A route optimization process after the terminal 41 in the foreign network initiates the transmission to the terminal 42 is the same as a route optimization process after the terminal 41 moves from the home network 1 to the foreign network 2, and therefore the latter example is shown in FIG. 4.

Figure 24:
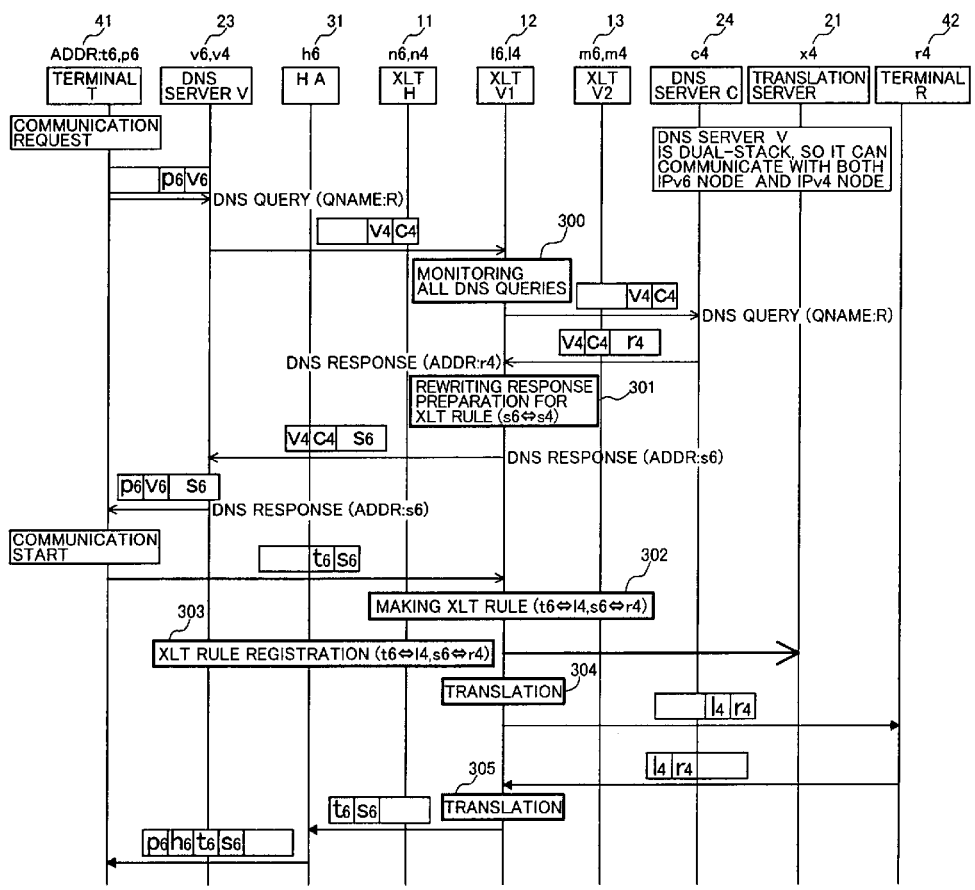
FIG. 24 is a sequence diagram in which the IPv6 mobile terminal in the foreign network originates a call.
Figure 25:
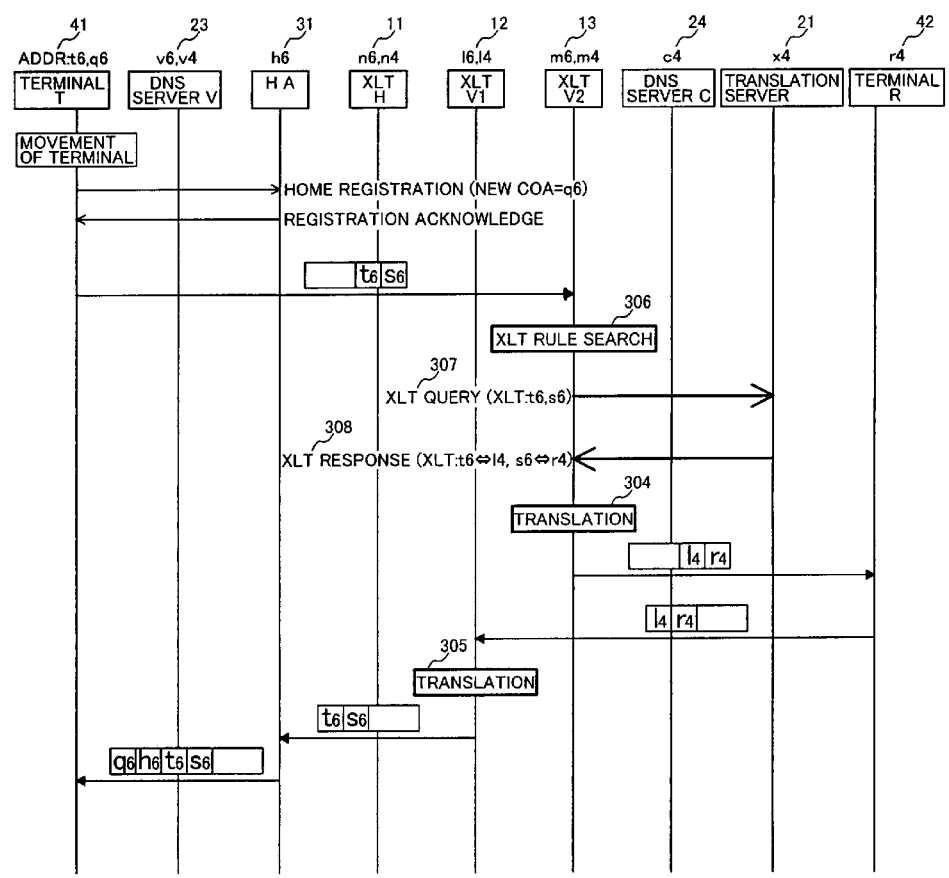
FIG. 25 is a sequence diagram in which the IPv6 mobile terminal moves after an end of the procedure shown in FIG. 24.
Figure 26:
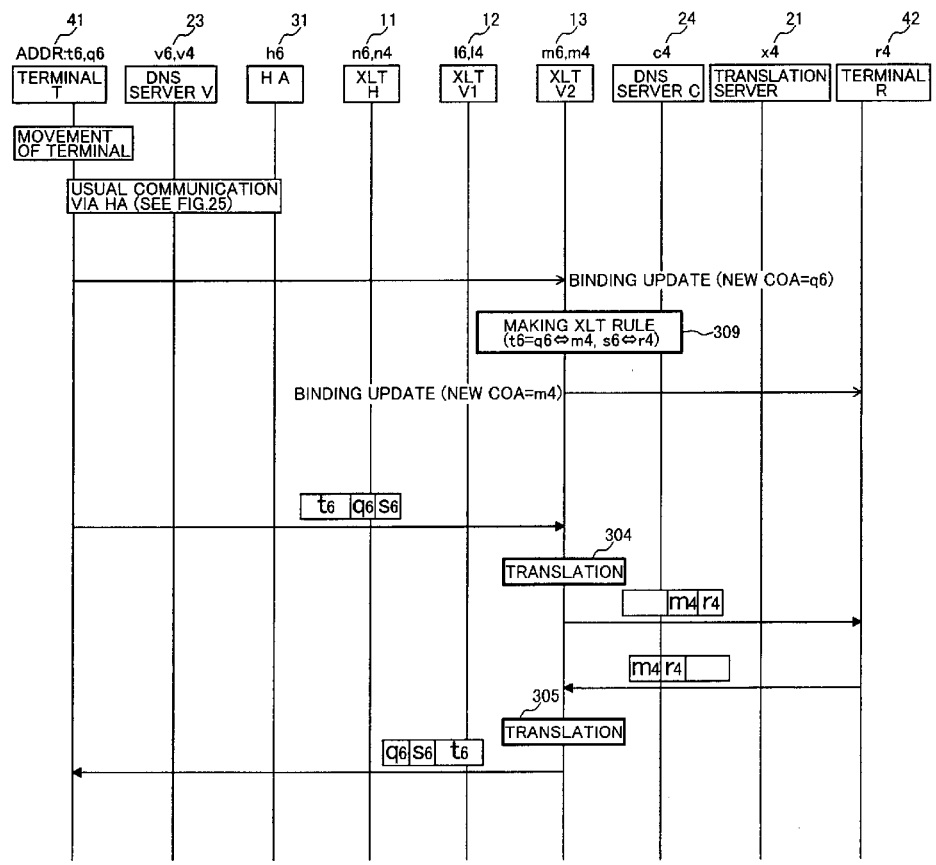
FIG. 26 is a sequence diagram of a route optimization performed when the IPv6 mobile terminal moves within the foreign network.

Operation procedures in FIGS. 2, 3, and 5 are shown in FIGS. 24, 25, and 26. In FIGS. 24, 25, and 26, three rectangles above an arrow totally represent an IP packet, with the respective rectangles representing a destination IP address, a source IP address, and an IP payload in this order from the beginning of the packet in the forward direction. Five rectangles represent a care of IP address, an IP address of a home agent, a destination IP address, a source IP address, and an IP payload, respectively. As shown in FIG. 24, for example, two IP addresses t6 and p6 are entered for the terminal 41; an address at left is a home IP address (IPv6 address) given to the terminal 41 and an address at right is a care of address (IPv6 address) given by the foreign network 2. In addition, are given ×4 (IPv4 address) to the translation server 21, v6 (IPv6 address) and v4 (IPv4 address) to the DNS server 23, a c4 (IPv4 address) to the DNS server 24, n6 (IPv6 address) and n4 (IPv4 address) to the translator 11, 16 (IPv6 address) and l4 (IPv4 address) to the translator 12, m6 (IPv6 address) and m4 (IPv4 address) to the translator 13, and r4 (IPv4 address) to the terminal 42.

Figure 54:
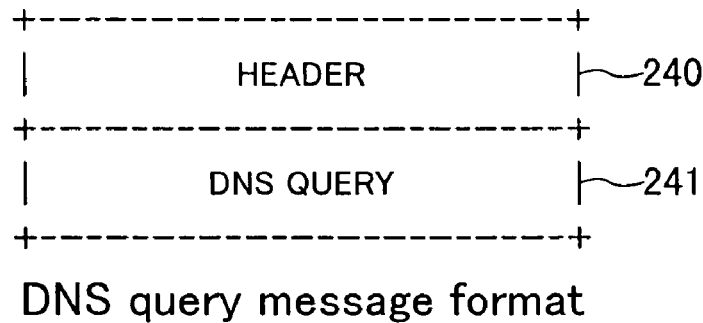
FIG. 54 is a diagram showing a DNS query message format.
Figure 55:
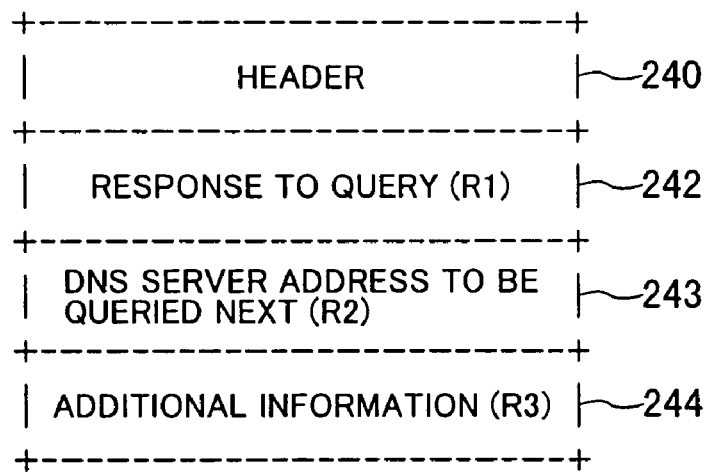
FIG. 55 is a diagram showing a DNS response message format.
Figure 56:
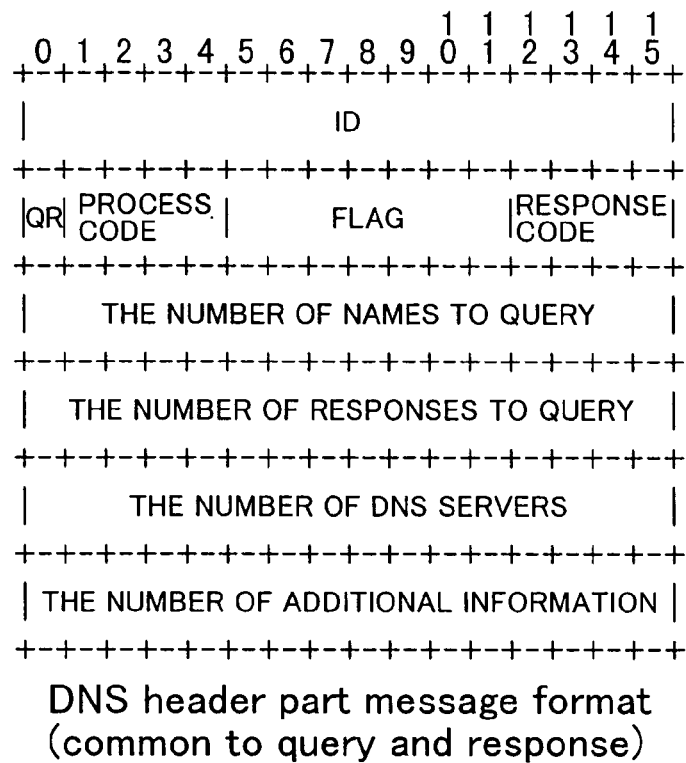
FIG. 56 is a diagram showing a DNS header part (message format (common to query and response)
Figure 57:
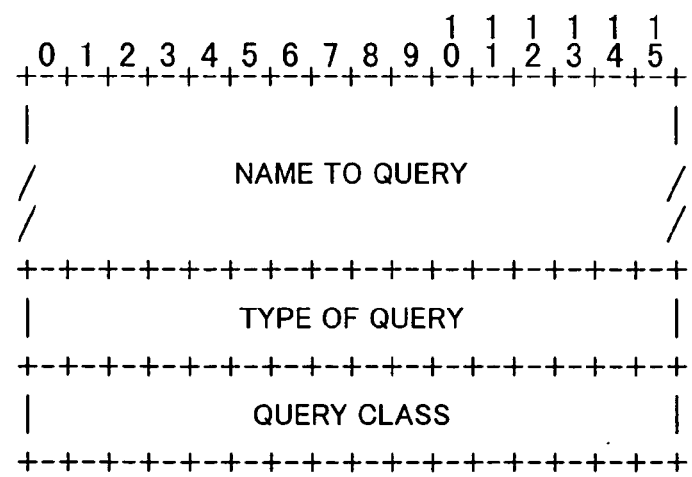
FIG. 57 is a diagram showing a DNS query part (FIG. 42) message format.
Figure 58:
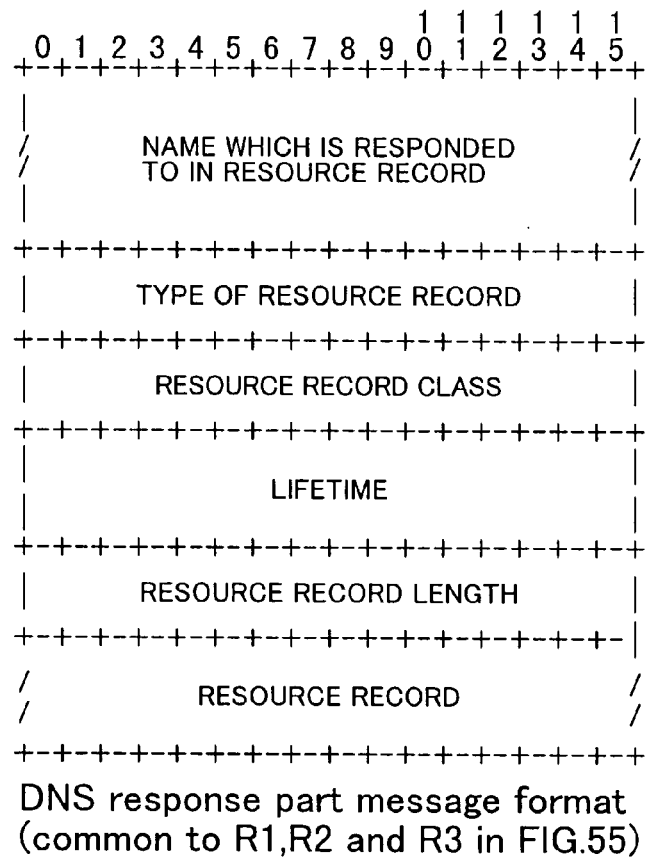
FIG. 58 is a diagram showing a DNS response part message format (common to R1, R2, and R3 in FIG. 43)

Referring to FIG. 24, there is shown an operation procedure for the mobile terminal 41 to communicate with the IPv4 terminal 42 in the foreign network 2. The translator 12 monitors all the DNS queries (refer to the Internet RFC Dictionary published by ASCII, pp. 323-329) in the DNS message translation and process 102. The terminal 41 transmits a DNS query to the DNS server 23 so as to acquire an IPv6 address from a name (assumed to be R) of the terminal 42. The DNS server 23 does not know the IP address corresponding to the name R and therefore transmits the DNS query to the DNS server 24. These packet formats are shown in FIGS. 54, 56, and 57. The translator 12 detects these packets (sequence 300) and awaits a response from the DNS server 24. FIGS. 55, 56, and 58 show DNS response packet formats. In this embodiment, the name R is entered into a header part shown in FIG. 58 of the response packet from the DNS server 24 and the IPv4 address r4 corresponding to the name is entered into an end of it. The translator 12 detects the response packet from the DNS server 24 and then rewrites the IPv4 address r4 to an IPv6 address s6 for the subsequent translation (sequence 301). This IPv6 address is a virtual one for the name R and therefore hereinafter referred to as a virtual destination IP address. This process is performed in the DNS message translation and process 102 in the translator 12. In this rewriting, an entry for associating r4 with s6 is prepared on the translation table 101 (see entry #1 in FIG. 22) in the translator 12. The DNS response packet rewritten from the actual destination IP address to the virtual destination IP address s6 is transmitted to the terminal 41 via the DNS server 23.

The terminal 41 which has received the DNS response packet begins to transmit an IP packet to the terminal 42. A destination IP address of these packets is s6 and their source IP address is t6 which is an IPv6 address of the terminal. When the IP packet transmitted from the terminal 41 arrives at the translator 12, the packet is transmitted to the data packet translation and process 104 in the translator 12. In the data packet translation and process 104, a translation table management part 101 is searched for by using the destination IP address s6 as a search key. Then, the above prepared entry (entry #1 in FIG. 22) is found and therefore a source IP address t6 of this packet, an IPv4 address l4 of the translator 12, a source port number, and a destination port number of this packet are written into the entry (entry #1 in FIG. 22). The address l4 is a virtual one for the source IP address t6 and hereinafter referred to as a virtual source IP address. Thereby, making the translation rule is completed (sequence 302). An item on the translation table 101, "Lifetime of entry" indicates how long the entry should be retained. Items on the translation table 101, "Source port number" and "Destination port number" are expected to be used for a process of transmitting the packet to a proxy server, for example, if the packet is found to be a Web access from the port number described in the header of the packet transmitted from the terminal 41. The above information is not always necessary. The information "Source port number" and "Destination port number" are not used in this embodiment.

Figure 59:
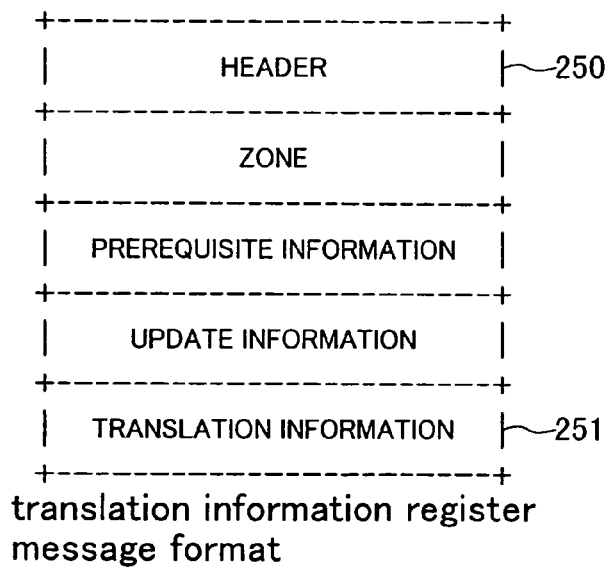
FIG. 59 is a diagram showing a translation information register message format.
Figure 62:
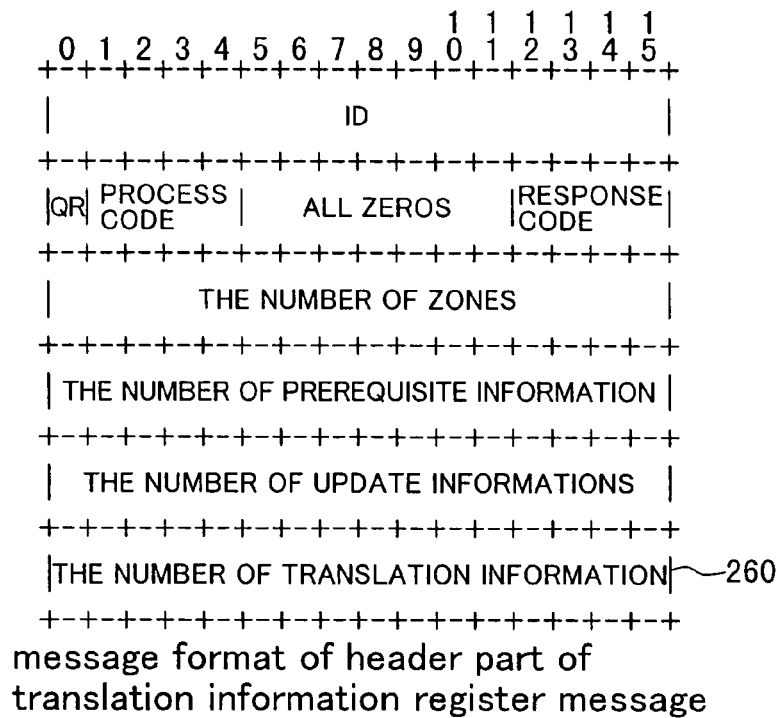
FIG. 62 is a diagram showing an embodiment of a message format of a header part of a translation information register message.

The translator 12 stores the translation rule made in this manner on the translation table 101 and registers the translation rule in the translation server 21 (sequence 303). This registration process is performed by the translation server query process 100 in the translator 12. At this time, it is a problem how the address of the translation server is acquired. In this embodiment, it is assumed to be initialized at the startup of the device. Referring to FIGS. 59 and 62, there are shown formats of this registration message. The generated translation rule is described in the part of the translation information 251 shown in FIG. 59.

In the translation server 21 which has received the registration message, the translation information register request process 111 fetches the translation information and stores it into the translation information storage part 110.

Figure 46:
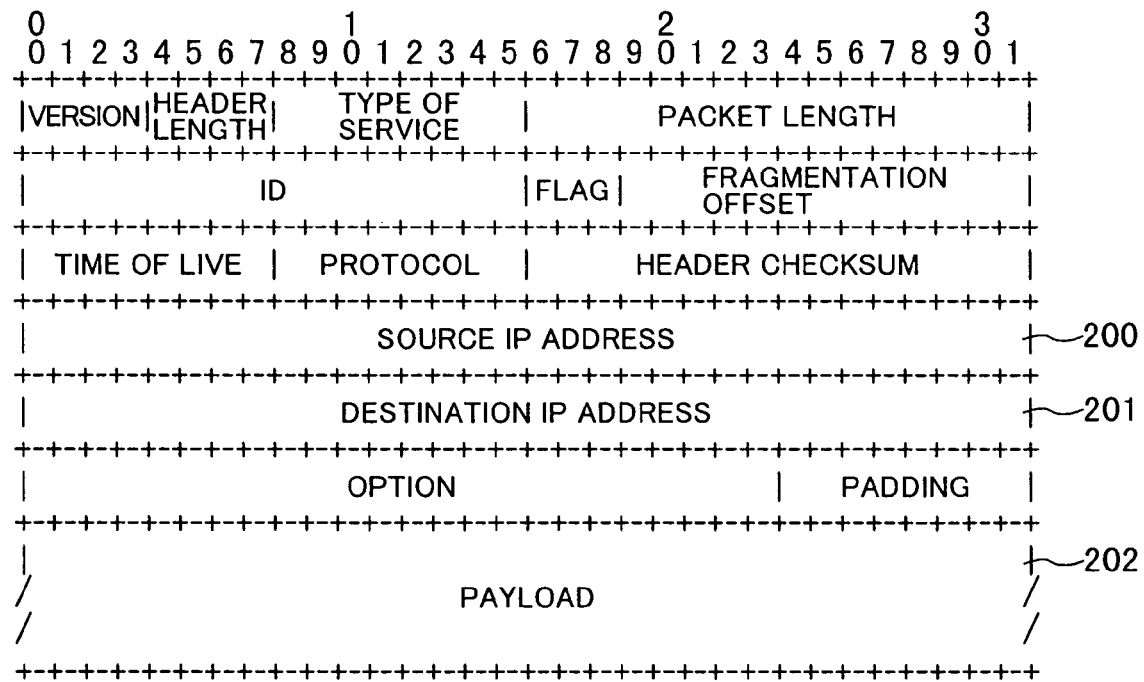
FIG. 46 is a diagram showing an IPv4 packet format.
Figure 47:
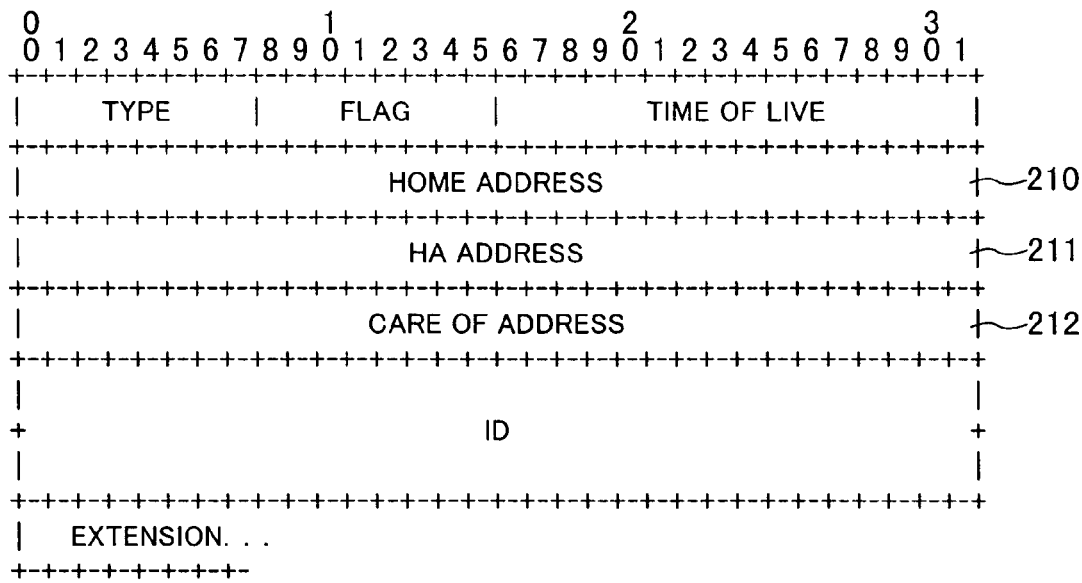
FIG. 47 is a diagram showing a Mobile IPv4 registration request message format.
Figure 48:
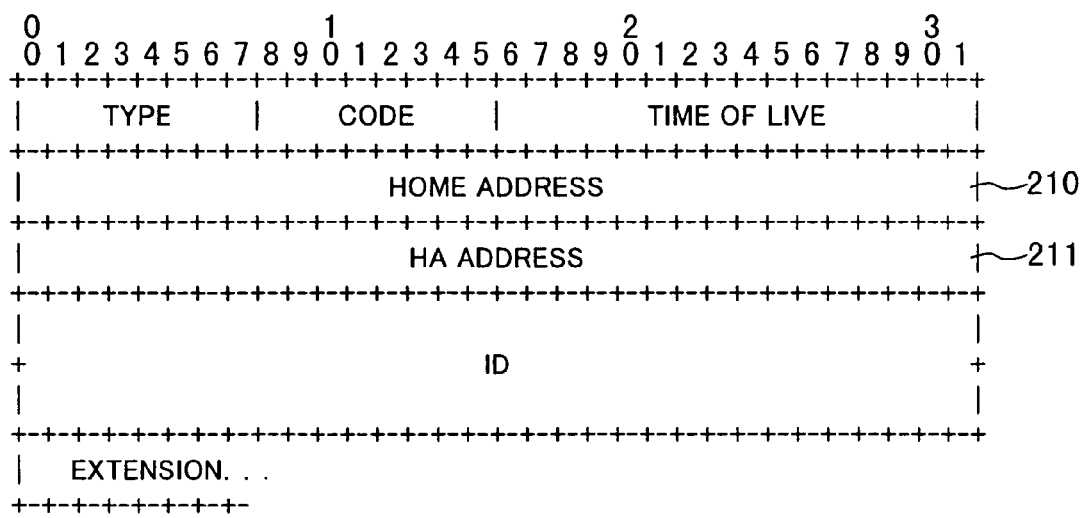
FIG. 48 is a diagram showing a Mobile IPv4 registration reply message format.

In the data packet translation and process 104 of the translator 12, the IPv6 addresses t6 and s6 in the packet are rewritten to l4 and r4, respectively (sequence 304), and then transmitted to the terminal 42. At the translation, not only the IP addresses, but also the packet format is translated from the IPv6 packet format to the IPv4 packet format. This format translation is also performed by the data packet translation and process 103 in the translator 12. For reference, there are shown the IPv6 packet format in FIG. 49 and the IPv4 packet format in FIG. 46.

On the other hand, the translator 12 rewrites the source IP address r4 to s6 and the destination IP address l4 to t6 conforming to the generated translation rule for the IPv4 packet transmitted from the terminal 42 and translates the IPv4 packet to the IPv6 packet (sequence 305). The translated packet is transmitted to the terminal 41.

Referring to FIG. 25, there is shown an operation procedure after the terminal 41 moves to the position r and before the terminal 41 begins to communicate with the terminal 42. With a movement, the terminal 41 is given a new care of address q6 (IPv6) by the foreign network 2. The translation service to the terminal located at the position r is provided by the translator 13.

Figure 49:
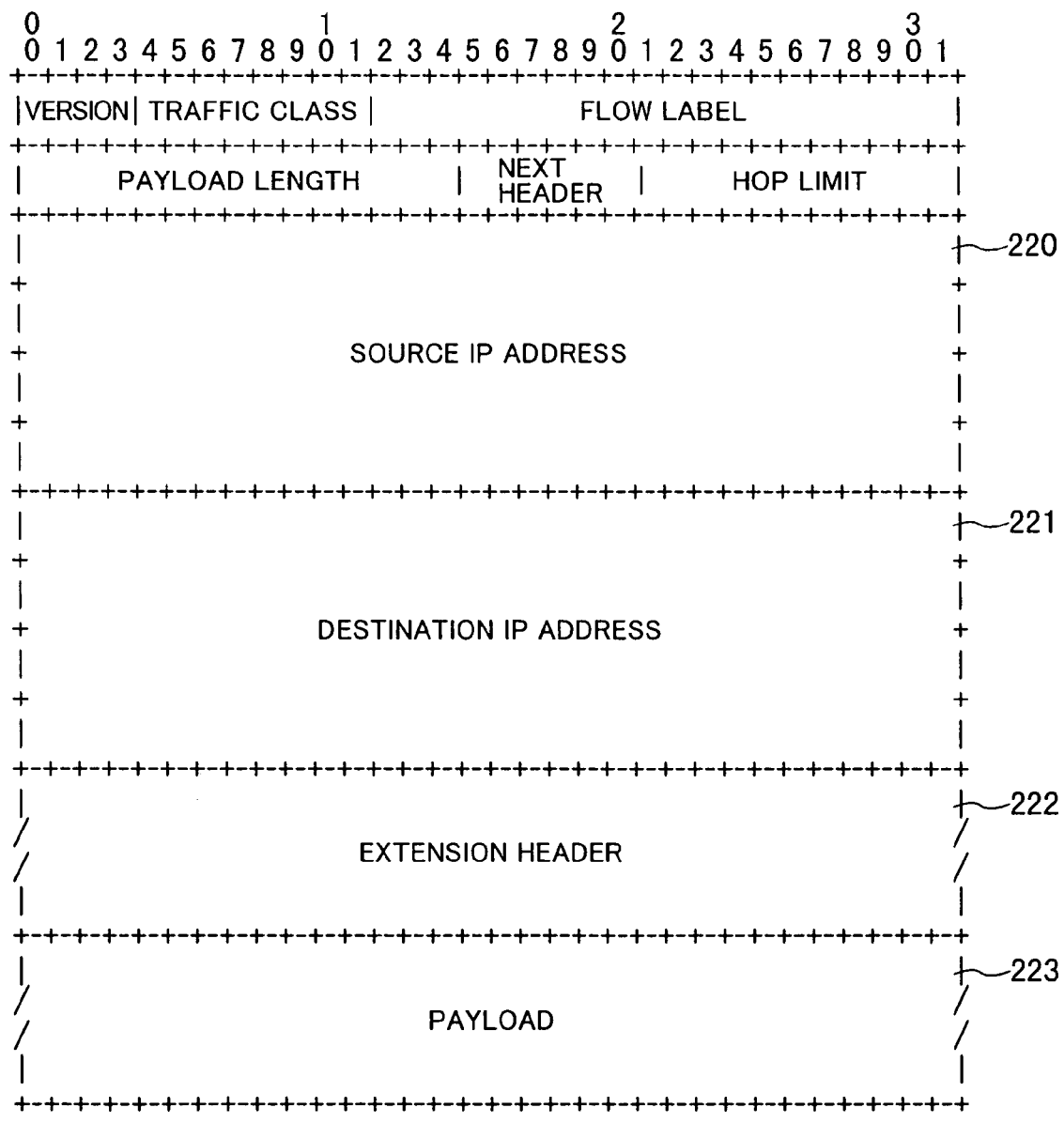
FIG. 49 is a diagram showing an IPv6 packet format.
Figure 50:
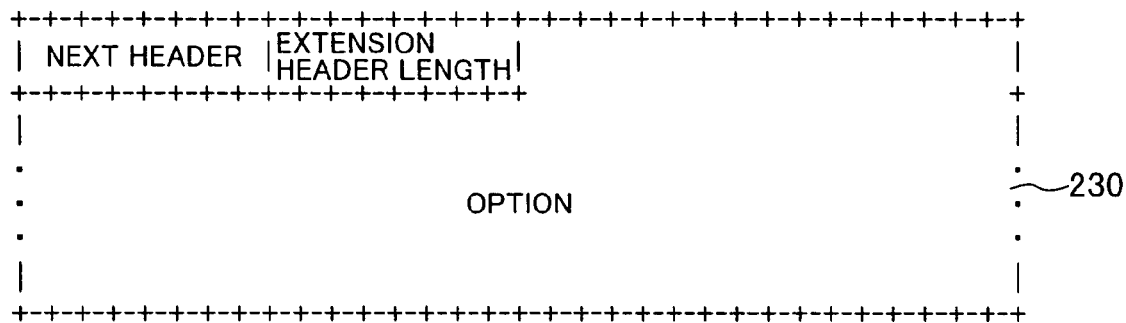
FIG. 50 is a diagram showing an IPv6 destination options header format.
Figure 51:
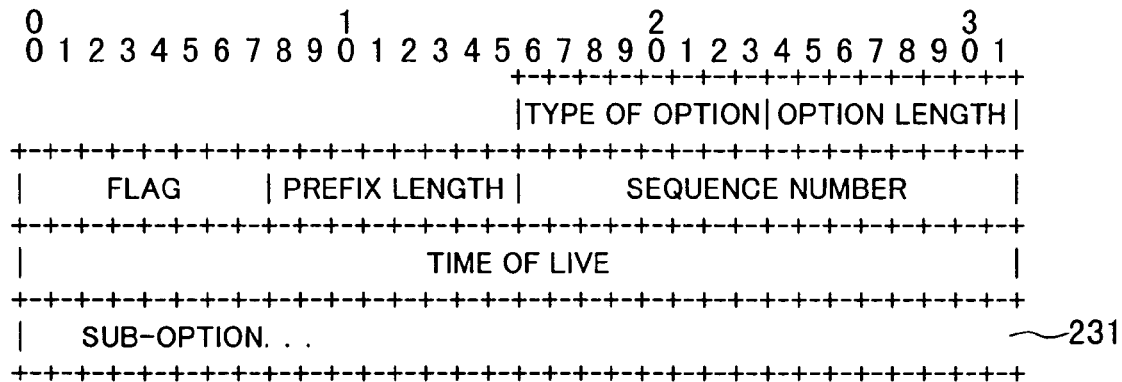
FIG. 51 is a diagram showing a mobile Ipv6 binding update message format.
Figure 52:
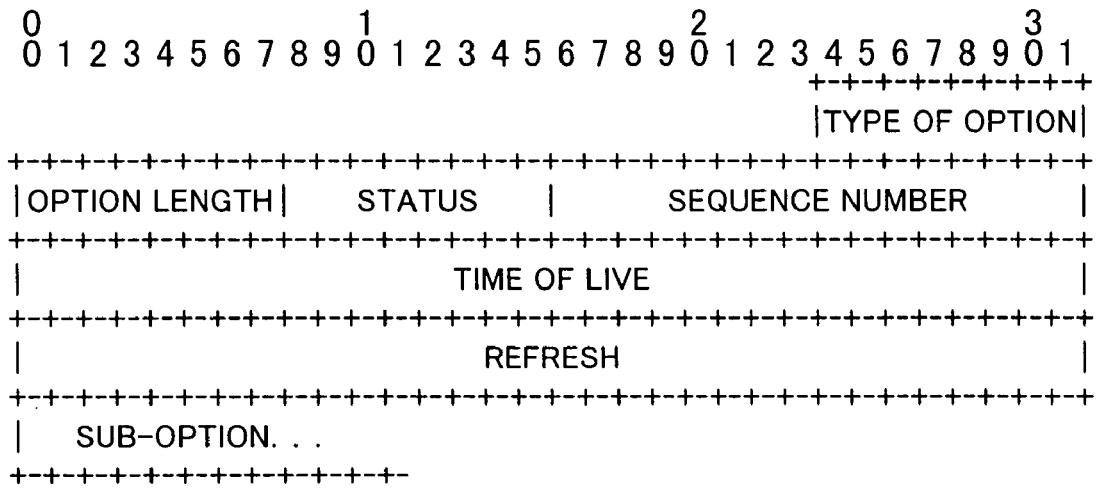
FIG. 52 is a diagram showing a Mobile IPv6 binding acknowledge message format.
Figure 53:
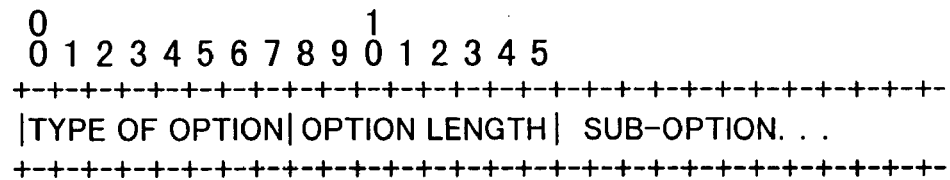
FIG. 53 is a diagram showing a Mobile IPv6 binding request message format.
Figure 60:
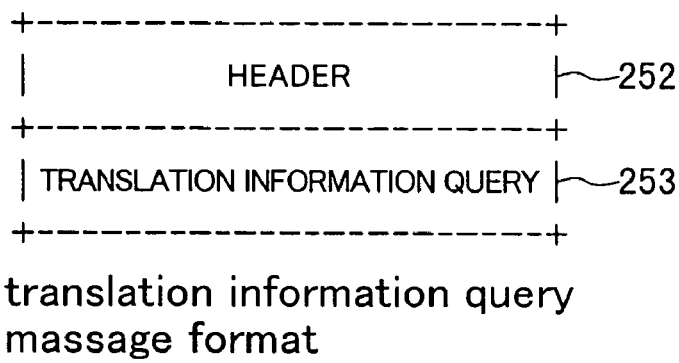
FIG. 60 is a diagram showing a translation information query message format.
Figure 63:
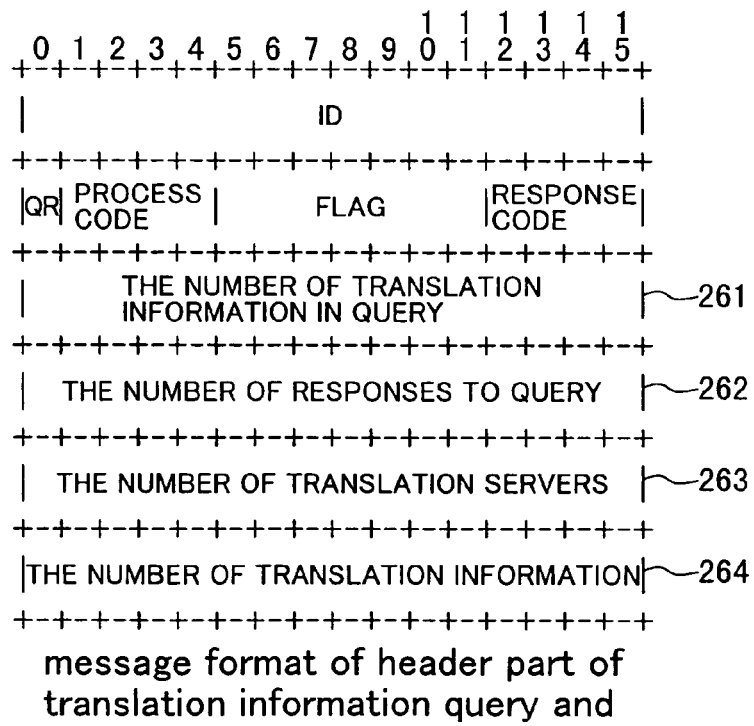
FIG. 63 is a message format of a header part of translation information query and a response message.
Figure 64:
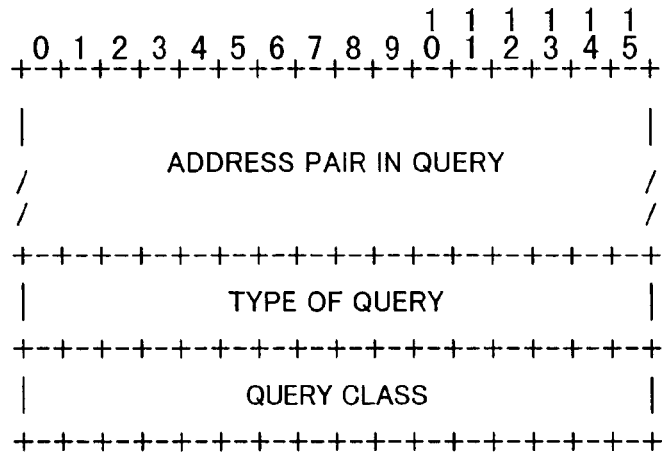
FIG. 64 is a diagram showing a translation information query part message format.

The terminal 41 registers the position of the home agent 31 of the Mobile IP, first. The packet formats are shown in FIGS. 49, 50, and 51. The terminal 41 registers the care of Ipv6 address q6 at the home agent 31 as the current position. After that, the terminal 41 transmits the packet to the terminal 42. This packet is received by the translator 13 and then transmitted to the data packet translation and process 104 shown in FIG. 19. The data packet translation and process 104 searches the translation table 101 for the virtual destination IP address s6 as a search key. At this time, however, there is no translation rule in the translator 13 and therefore the IP address cannot be rewritten (sequence 306). If it is reported to the translation server query process 100 in the translator 13, the translation server query process 100 inquires the translation information of the translation server 21 (sequence 307). Referring to FIGS. 60, 63, and 64, there is shown an embodiment of the query packet format. Into the first part in FIG. 60, is entered the virtual destination IP address s6 which is a search key of the desired translation information. In the data packet translation and process 104, a packet which cannot be translated is retained for a certain period.

Figure 61:
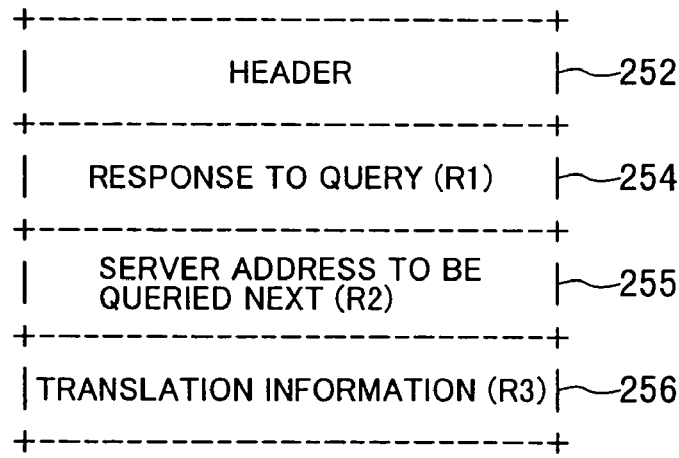
FIG. 61 is a diagram showing an embodiment of a translation information response message format.
Figure 65:
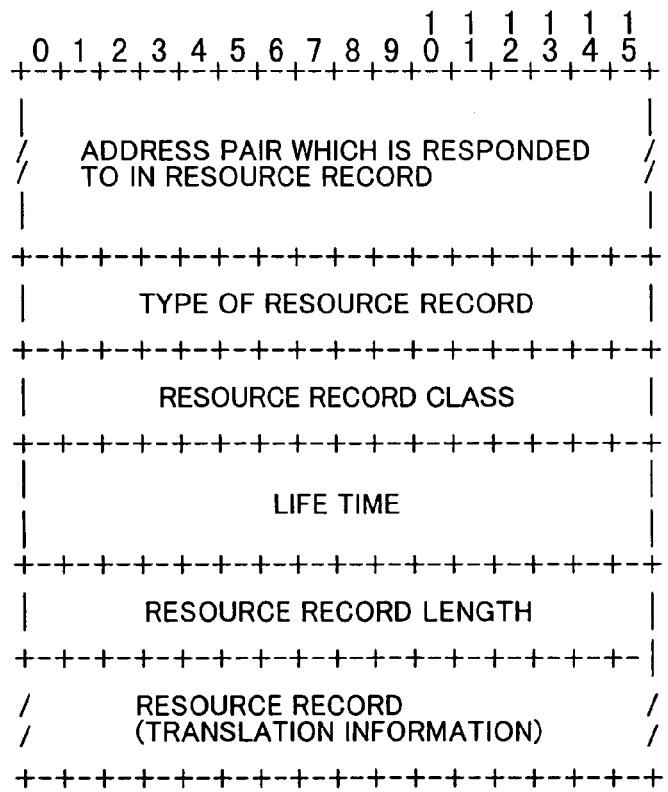
FIG. 65 is a diagram showing a translation information response part message format (common to R1, R2, and R3 in FIG. 61).

The translation information query process 112 in the translation server 21 fetches the search key s6 from the query packet. Next, the translation information 110 is searched using s6 as a search key. As described above, the translation information 110 contains the registered translation rules (a correspondence between t6 and l4, a correspondence between s6 and r4, etc.) corresponding to the virtual destination IP address s6. The translation information searched for and found based on the translation information 110 is returned to the translation information query process 112. The translation information query process 112 stores the received translation information in the format shown in FIGS. 61, 63, and 65 and makes a response to the translator 13 (sequence 308). The translation information is stored in the last part in FIG. 65.

The translator 13 fetches the translation information based on the response from the translation server 21 by the translation server query process 100 and then stores it into the translation table 101. After that, the data packet translation and process 104 rewrites the retained packet from the IPv6 addresses t6 and s6 to l4 and r4, respectively, on the basis of the translation information (sequence 304) and then transmits it to the terminal 42. At the translation, the packet format is translated from the IPv6 packet format to the IPv4 packet format as well as the IP address. This format translation is also performed by the data packet translation and process 103 in the translator 12.

On the other hand, the translator 13 rewrites the source IP address r4 to s6 and the destination IP address l4 to t6 conforming to the translation table 101 also for the IPv4 packet transmitted from the terminal 42 and translates the IPv4 packet to the IPv6 packet (sequence 305). The translated packet is transmitted to the terminal 41 via the home agent 31.

Figure 6:
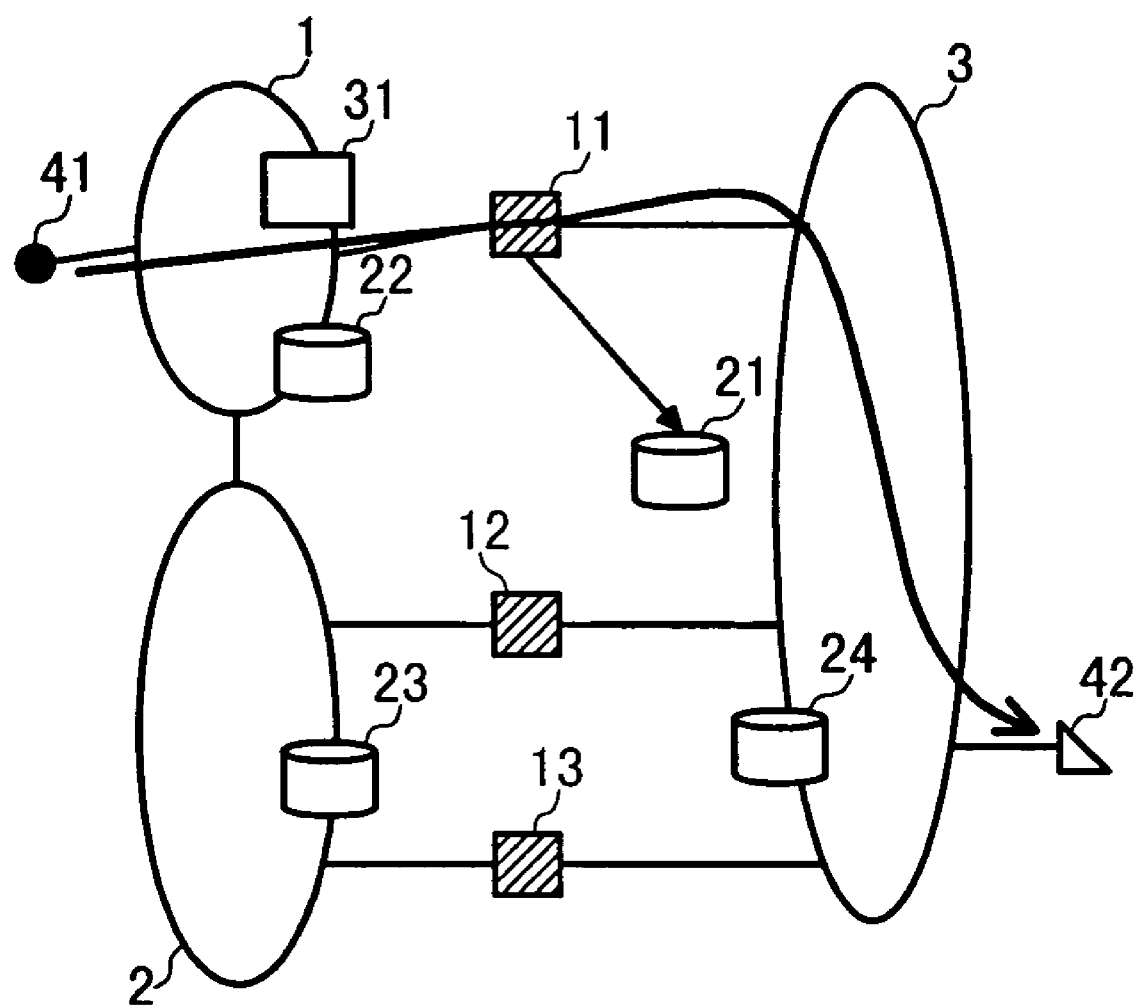
FIG. 6 is a diagram of assistance in explaining a communication route selected if the IPv6 mobile terminal initiates a communication in the home network.

Referring to FIG. 26, there is shown an operation procedure for performing the route optimization described by referring to FIG. 6.

After the end of the procedure shown in FIG. 25, the mobile terminal can select whether the route optimization should be performed. If the route optimization is performed, the terminal 41 registers the care of IPv6 address q6 given by the foreign network 2 as the current position at the terminal 42 which is a correspondent party in the same manner as for the registration of the current position at the home agent (HA). The translator 13 monitors a position registration message from the terminal 41 to the terminal 42 in the same manner as for the DNS message. If the translator 13 detects the position registration message described in IPv6 destined for the terminal 42 from the terminal 41, the message is transmitted to the Mobile IP message translation and process 103 by the input packet filtering process. The Mobile IP message translation and process 103 associates a virtual source IP address m4 with a pair of the source IP address t6 and the care of address q6, makes a translation rule for associating s6 with r4, and retains it in the translation table 101 (see the #4 entry in FIG. 22). Additionally, the Mobile IP message translation and process 103 translates the care of address q6 described in the position registration message to m4 and transmits it to the terminal 42. While the current position information is described in the payload of the packet in the IPv4 Mobile IP, it is described in the header of the packet in the IPv6 Mobile IP. Therefore, the Mobile IP message translation and process 103 performs the format translation as well as rewriting the address and then transmits the position registration message to the terminal 42.

After performing the route optimization, the mobile terminal 41 uses the care of address q6 as a source IP address when transmitting a packet to the terminal 42. Then, the original address is described in the IPv6 extended header part (FIG. 49). When translating the packet in the data packet translation and process 104, the translator 13 searches the translation table 101 using an address in the extended header (the original source IP address) as well as the source IP address (the care of address) in the IP header and the destination IP address (the virtual destination IP address) as a search key. This prevents an entry before the route optimization from being searched for. Whether the address in the extended header should be used as a search key is determined by a presence or an absence of the extended header. In other words, if the original source IP address exists in the extended header, it is always added to the search keys. Accordingly, the packet can be converted based on the translation information even if the terminal moves.

Figure 27:
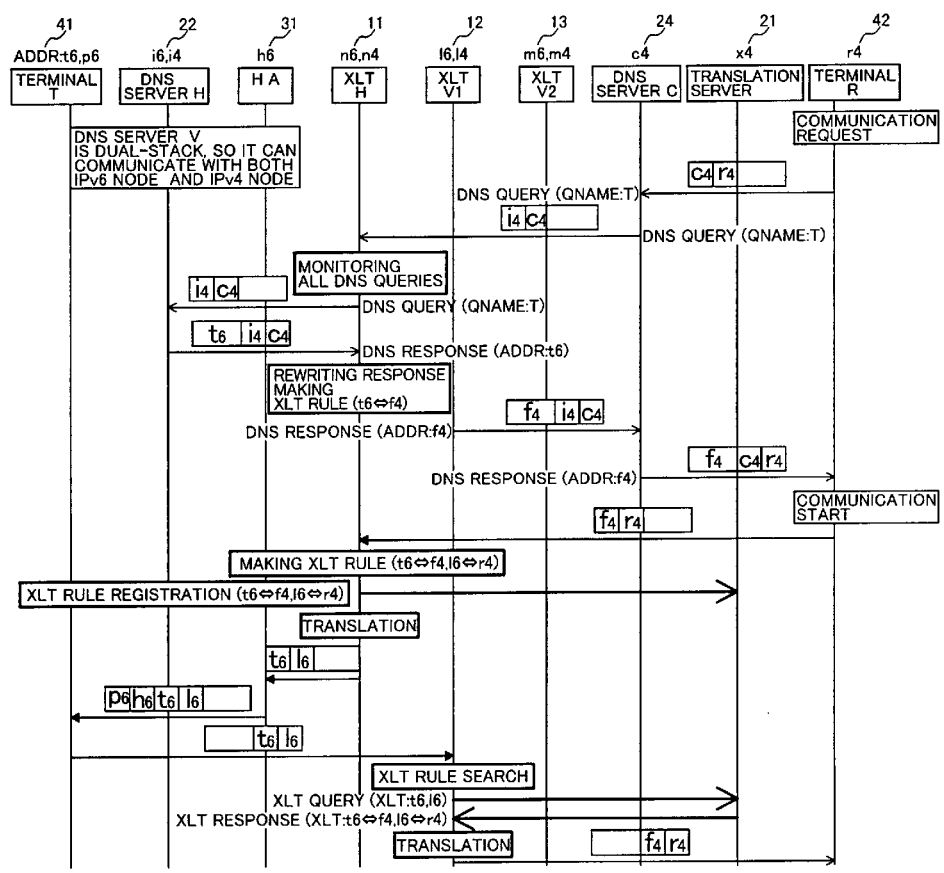
FIG. 27 is a sequence diagram in which the IPv6 mobile terminal in the foreign network receives a call.

The above embodiment has been described for a transmission from the mobile terminal 41 to the terminal 42. FIG. 27 contrarily shows a procedure in which the terminal 42 initiates a communication with the terminal 41 located in the position q. While this procedure differs from the above procedure in respects of the DNS server which the terminal 42 queries and the like, it can be easily understood from the procedure described by using FIG. 24 and therefore a detailed description will be omitted here. This embodiment is characterized by that a DNS query from the terminal 42 is transmitted to a DNS server 22 via a DNS server 24 since the IP address corresponding to a name T of the terminal 41 is associated with a home address t6, that the translator 11 thereby makes a translation rule for associating t6 with a virtual destination IP address f4, and that the translator 11 treats the virtual source IP address as an IPv6 address l6 of the translator 12 to associate r4 with l6 when making a translation rule since a packet destined for the terminal 42 from the terminal 41 passes through the translator 12. In FIG. 27, the DNS server 22 is given i6 (IPv6 address) and i4 (IPv4 address).

Figure 28:
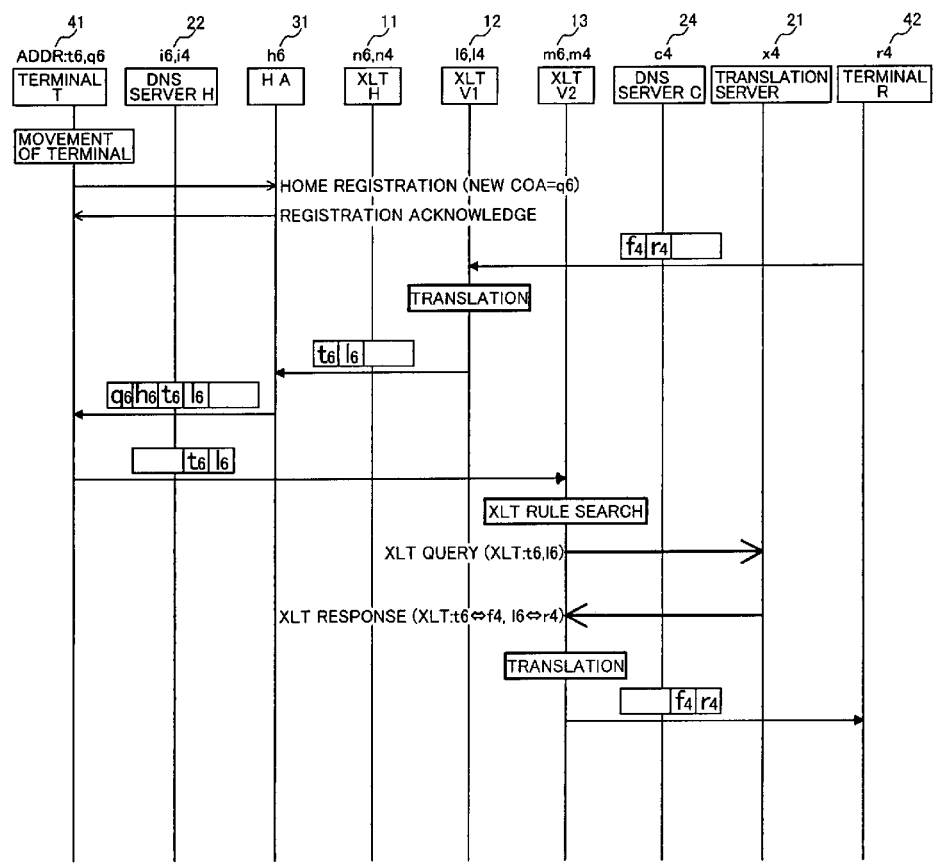
FIG. 28 is a sequence diagram in which the IPv6 mobile terminal in the foreign network moves.

Referring to FIG. 28, there is shown an operation procedure after the terminal 41 moves to the position r and before the terminal 42 starts to communicate with the terminal 41. This procedure can be easily understood from the procedure described by using FIG. 25 and therefore the description is omitted here.

Figure 29:
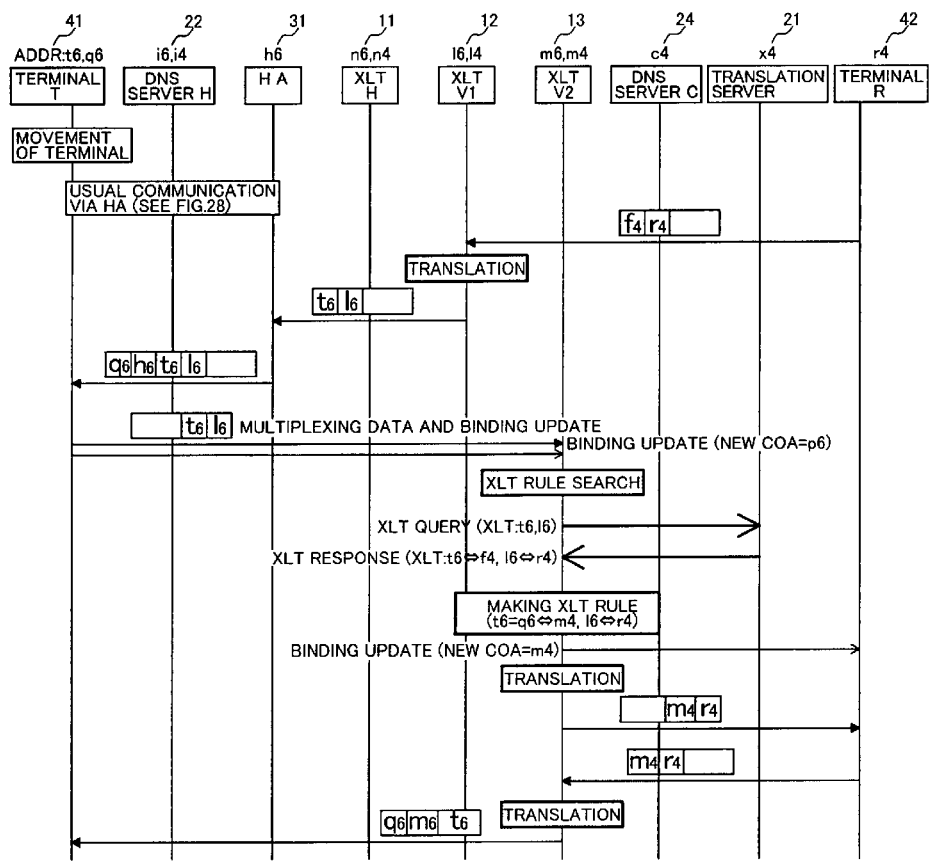
FIG. 29 is a sequence diagram for a route optimization after an end of the procedure shown in FIG. 28.

Referring to FIG. 29, there is shown a procedure for optimizing a route after the end of the procedure shown in FIG. 28. This procedure can be easily understood from the procedure described by using FIG. 26 and therefore a detailed description is omitted here. While the terminal 41 registers the current position at the terminal 42 as the position registration message via the translator 13 and begins to transmit a packet destined for the terminal 42 in the procedure described by using FIG. 26, the position registration message is transmitted together with the packet destined for the terminal 42 in the procedure shown in FIG. 29. Then, in the translator 13, the current position is registered at the terminal 42 by the same process as one described by using FIG. 26 and then the source IP address of the packet is rewritten to be transmitted to the terminal 42.

Referring to FIG. 6, there is shown a diagram of a communication route selected if the mobile terminal 41 initiates a communication with the IPv4 terminal 42 in the home network 1.

Figure 7:
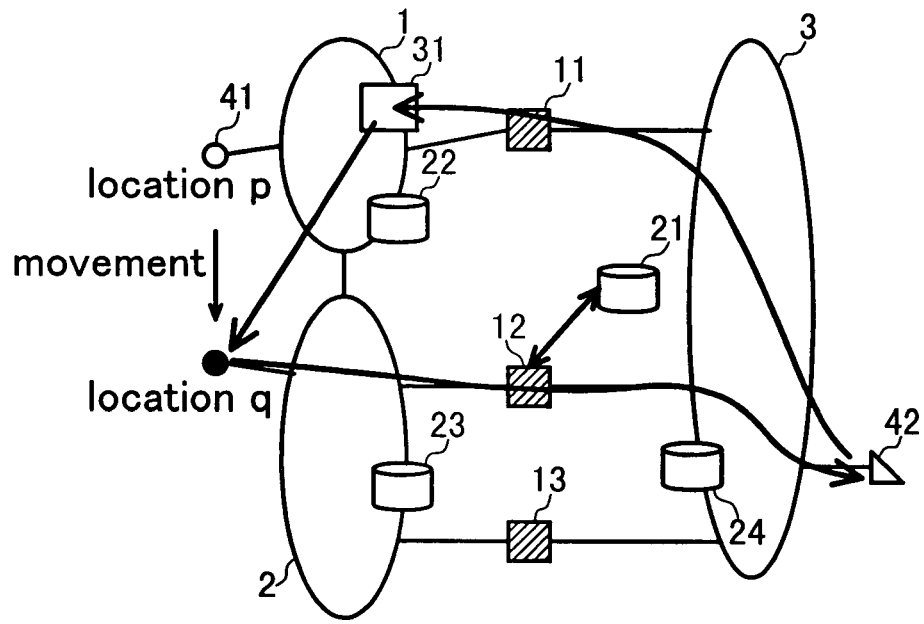
FIG. 7 is a diagram of assistance in explaining a communication route selected if the IPv6 mobile terminal moves from the home network to the foreign network.
Figure 30:
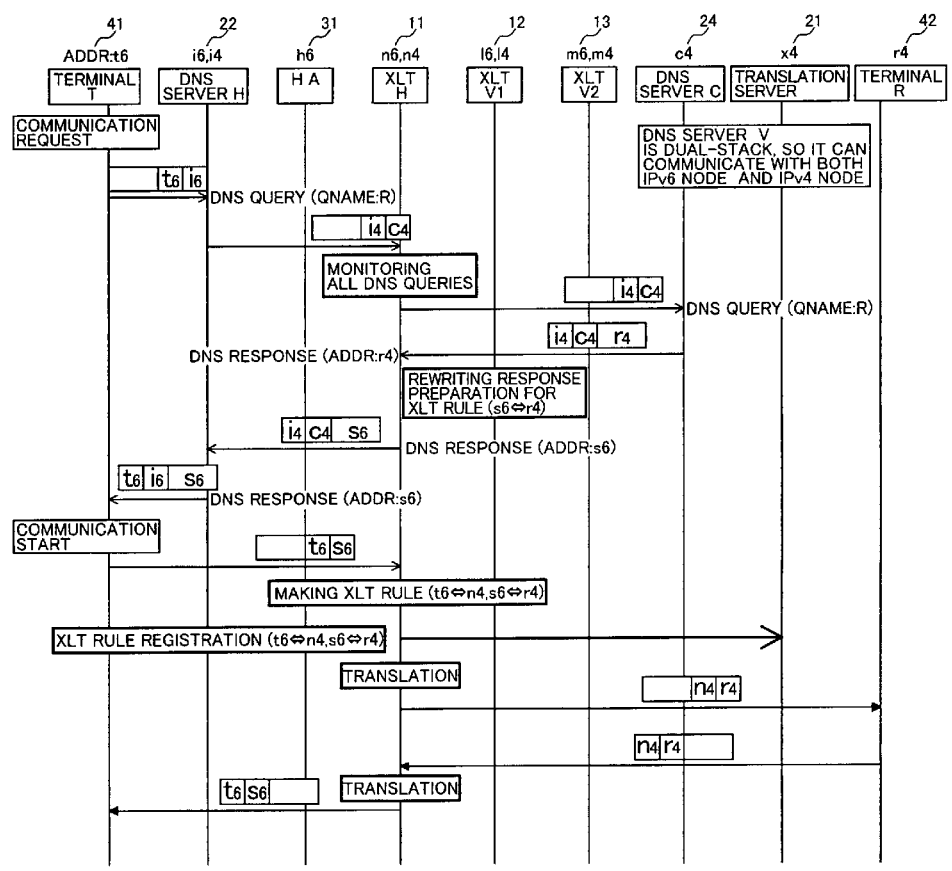
FIG. 30 is a sequence diagram in which the IPv6 mobile terminal originates a call in the home network.
Figure 31:
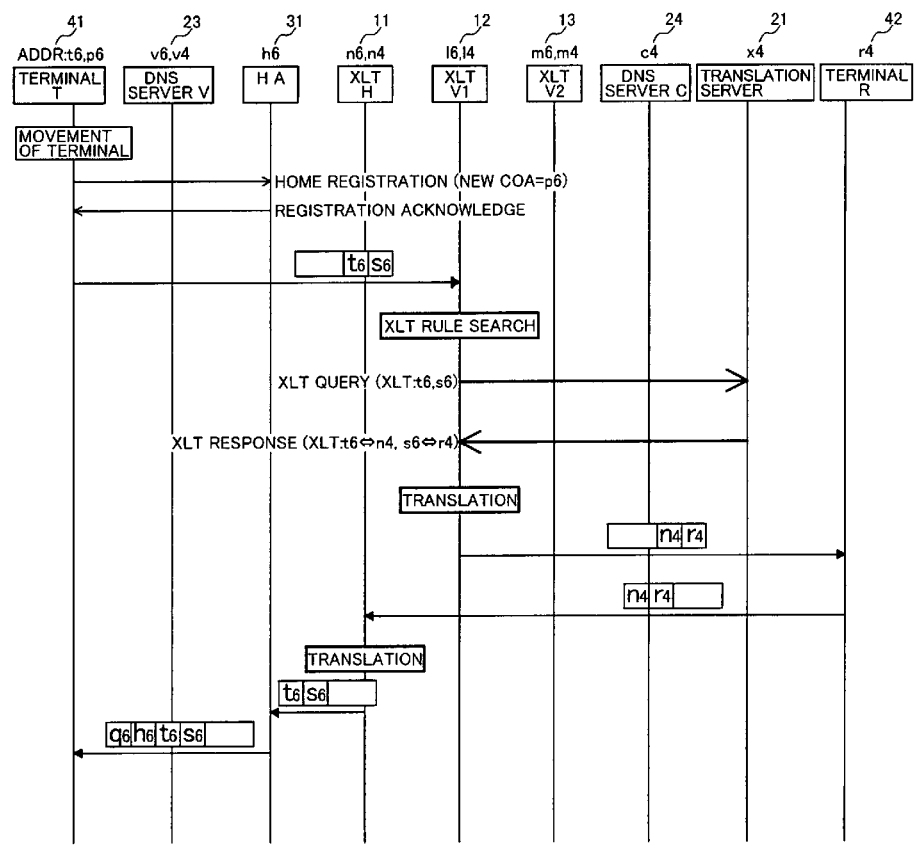
FIG. 31 is a sequence diagram in which the IPv6 mobile terminal moves from the home network to a foreign network.

Referring to FIG. 7, there is shown a communication route selected if the mobile terminal moves to a foreign network 2 (position q). Referring to FIG. 30 and FIG. 31, there are shown communication procedures in FIG. 6 and FIG. 7, respectively. FIG. 24 shows an operation procedure after the terminal 41 initiates the communication and before it actually starts to exchange data to or from the terminal 42 and FIG. 25 shows an operation procedure after the terminal 41 moves and before it starts to exchange data. These procedures are the same as those described by using FIGS. 24 and 25 except the differences of the related DNS server and translators. Describing this point by way of caution, the home address t6 is associated with the IPv4 address n4 of the translator in these procedures and therefore the packet transmitted from the terminal 42 to the terminal 41 passes through the translator 11, which is different from the procedures described by using FIGS. 24 and 25.

Figure 8:
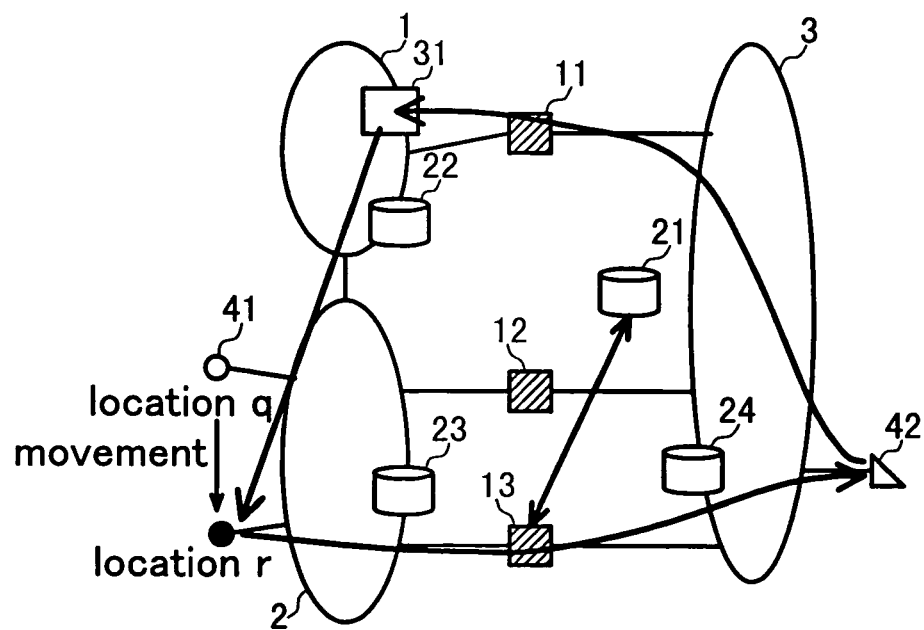
FIG. 8 is a diagram of assistance in explaining a communication route selected if the IPv6 mobile terminal further moves from the location shown in FIG. 7.
Figure 32:
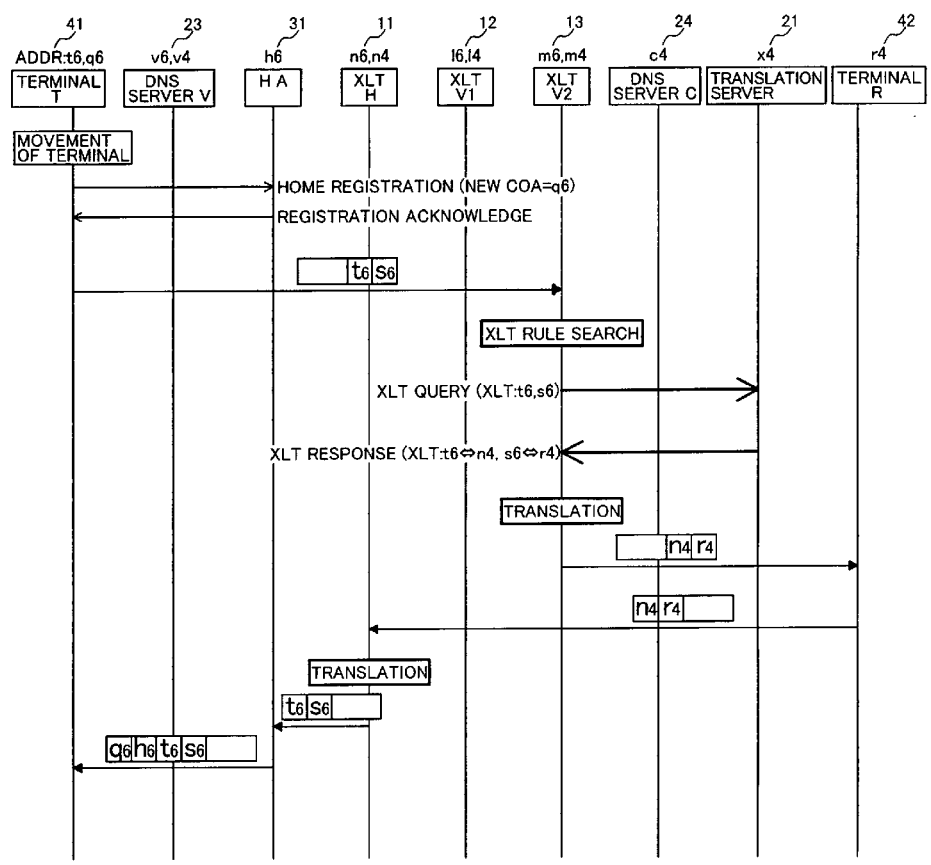
FIG. 32 is a sequence diagram in which the IPv6 mobile terminal further moves in the foreign network.

Referring to FIG. 8, there is shown a communication route selected if the terminal 41 moves from the position q to a position p. Referring to FIG. 32, there is shown an operation procedure in this route. This procedure is the same as one described by using FIG. 25 except a difference of related translators.

Figure 33:
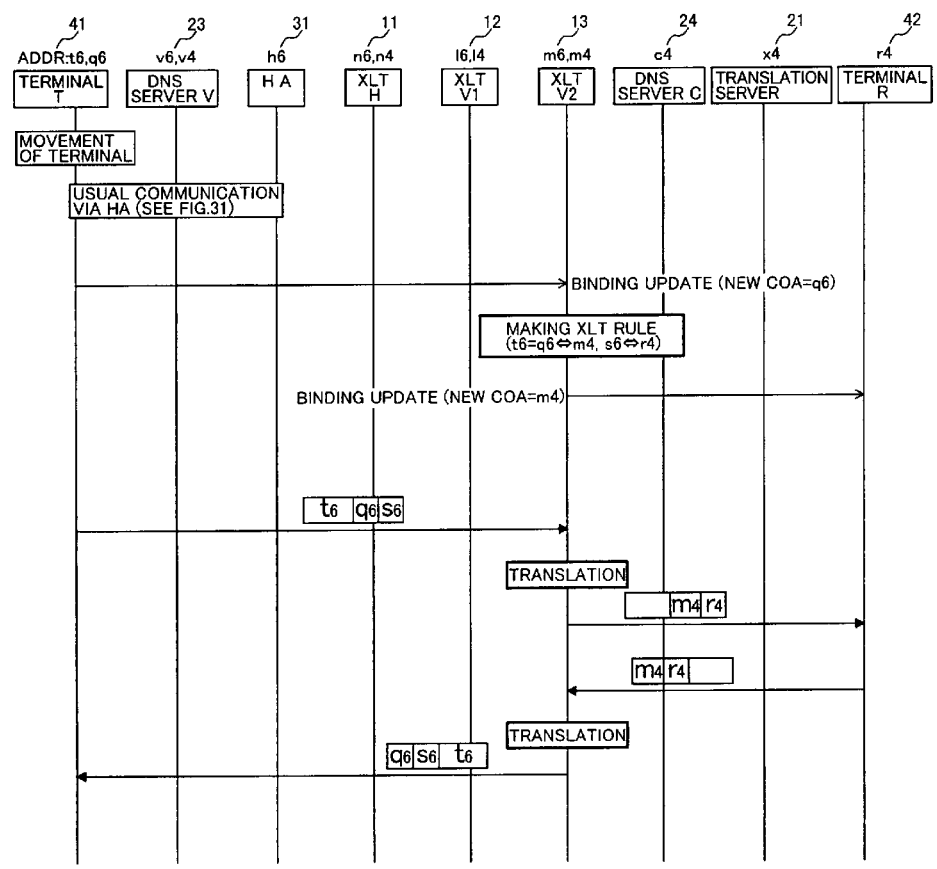
FIG. 33 is a sequence diagram of a route optimization after an end of the procedure shown in FIG. 31.
Figure 34:
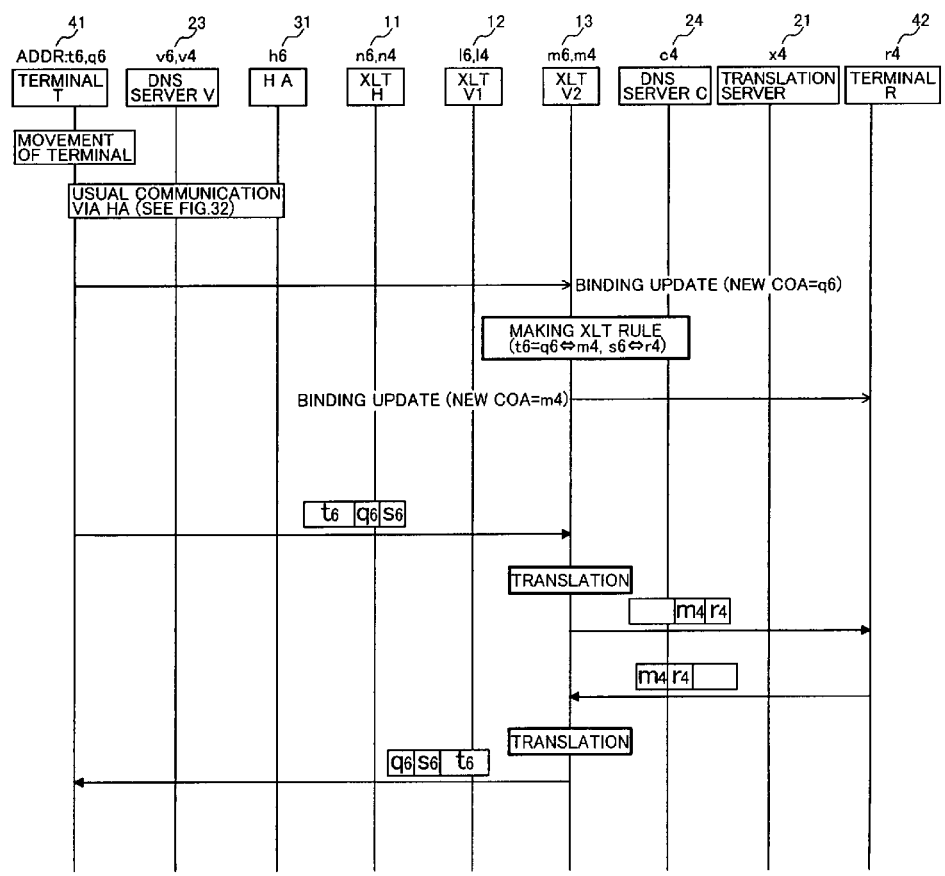
FIG. 34 is a sequence diagram for a route optimization after an end of the procedure shown in FIG. 32.

FIG. 4 set forth in the above also shows a communication route selected if the route is optimized after the terminal 41 moves from the position p to the position q. Additionally FIG. 5 in the above shows a communication route selected if the terminal 41 further moves from the position q to the position r after the route optimization. Referring to FIGS. 33 and 34, there are shown operation procedures for the respective cases. These procedures are the same as those described by using FIG. 26 except differences of related translators.

Figure 35:
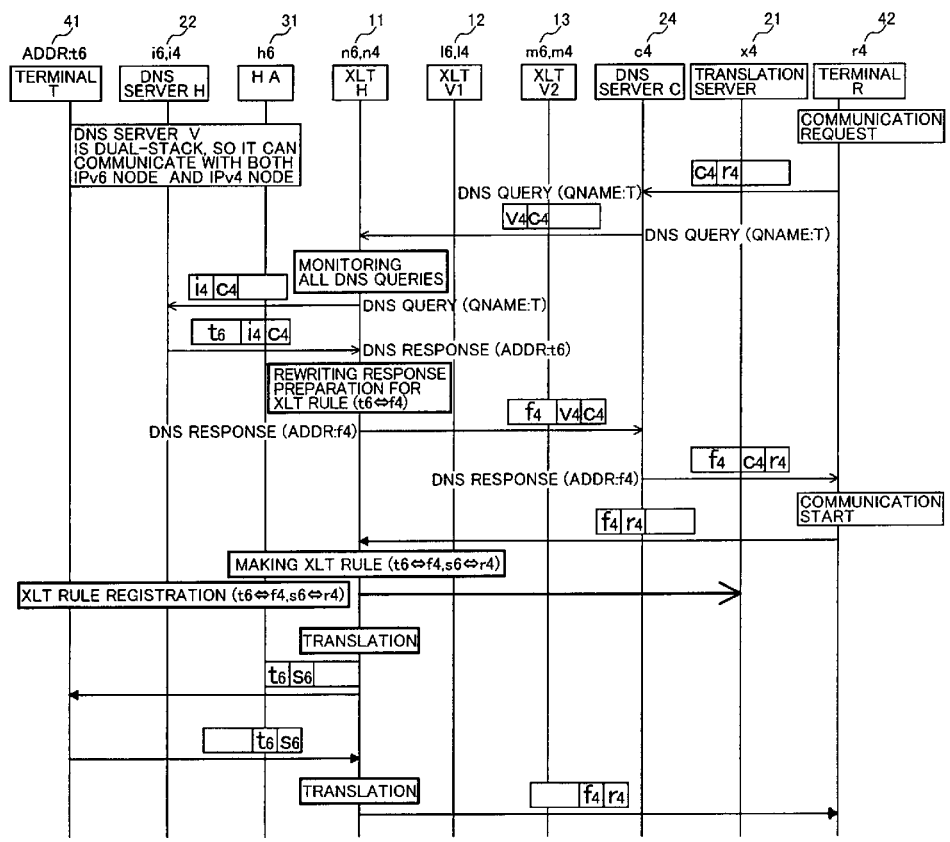
FIG. 35 is a sequence diagram in which the IPv6 mobile terminal in the home network receives a call.
Figure 36:
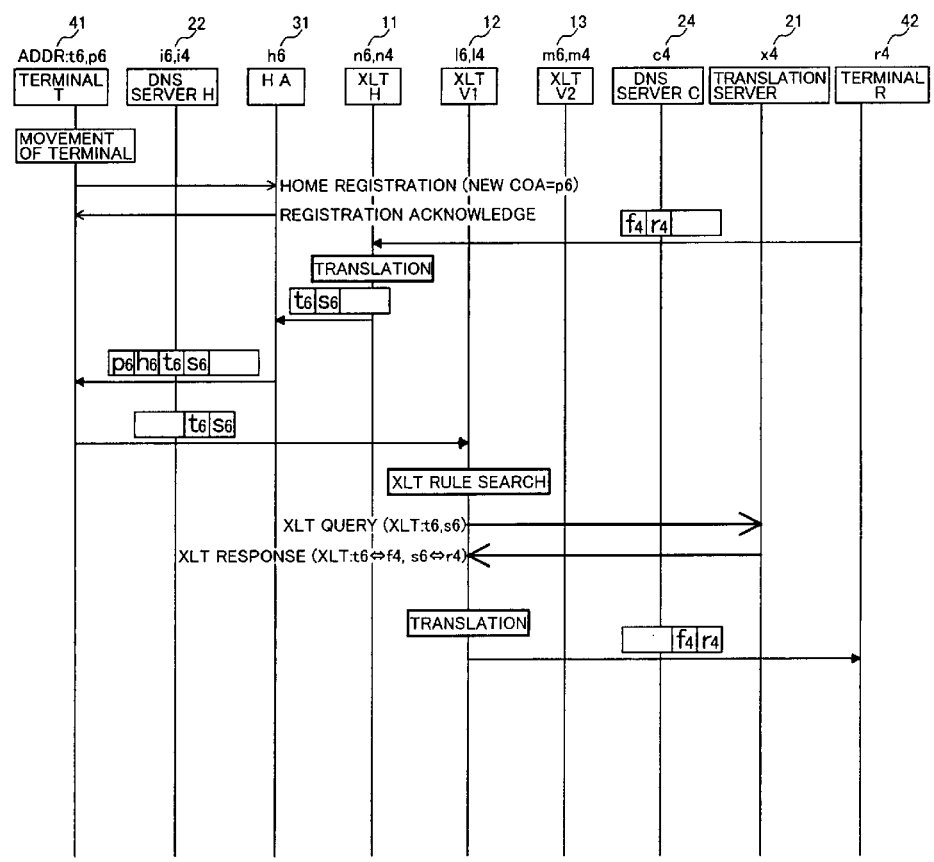
FIG. 36 is a sequence diagram in which the IPv6 mobile terminal moves to a foreign network after an end of the procedure shown in FIG. 35.
Figure 37:
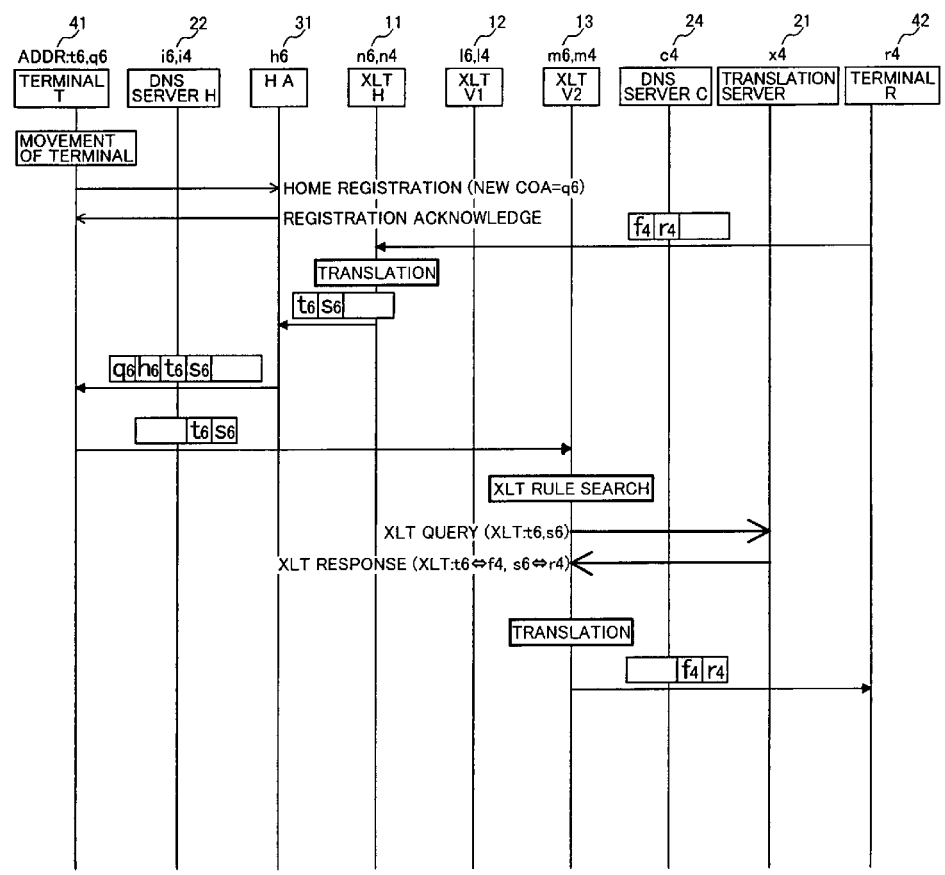
FIG. 37 is a sequence diagram in which the IPv6 mobile terminal further moves in the foreign network after an end of the procedure in FIG. 36.
Figure 38:
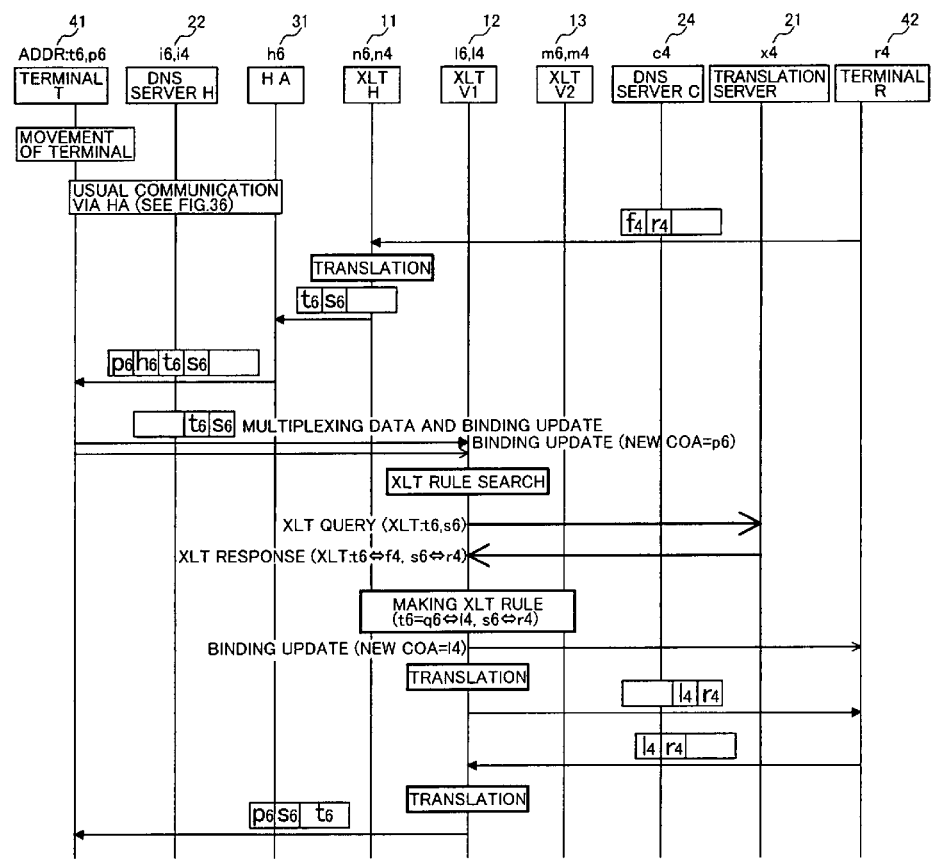
FIG. 38 is a sequence diagram for a route optimization after an end of the procedure shown in FIG. 36.
Figure 39:
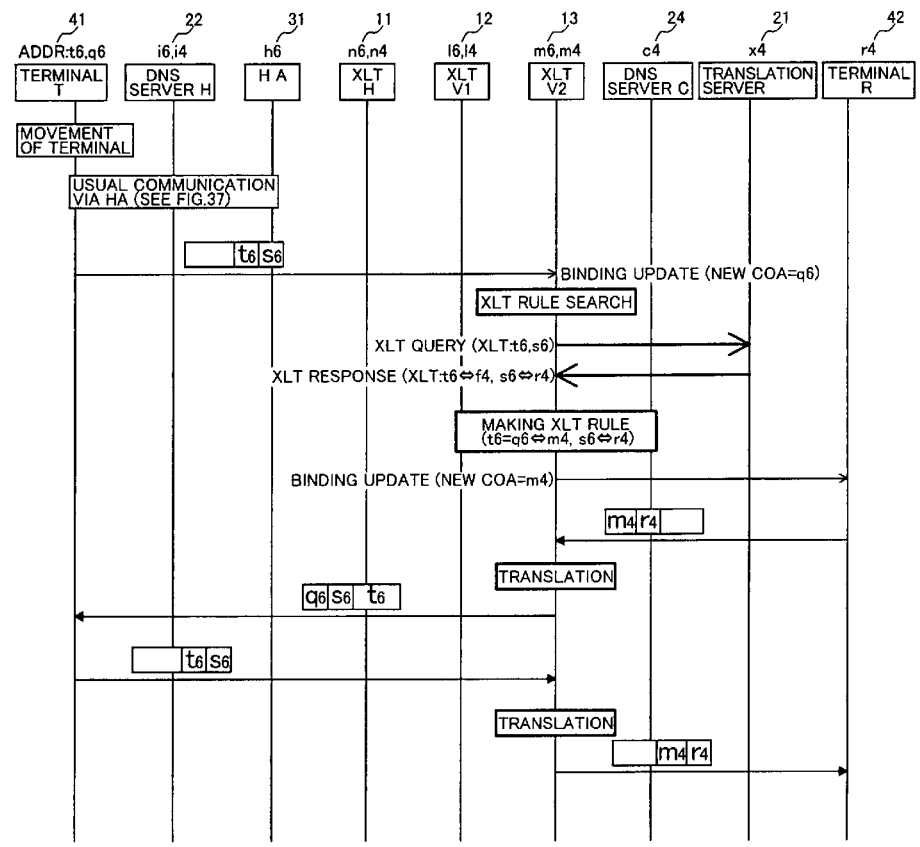
FIG. 39 is a sequence diagram for a route optimization after an end of the procedure shown in FIG. 37.

Referring to FIG. 35, there is shown a communication procedure for starting a communication from the terminal 42 to the mobile terminal 41 in FIG. 6. Referring to FIG. 36, there is shown an operation procedure for starting a communication from the terminal 42 to the mobile terminal 41 when the terminal 41 moves as shown in FIG. 7. Referring to FIG. 37, there is shown an operation procedure for starting a communication from the terminal 42 to the mobile terminal 41 when the terminal 41 moves to the position shown in FIG. 8 from the condition in FIG. 7. Referring to FIG. 38, there is shown an operation procedure for starting a communication from the terminal 42 to the mobile terminal 41 used when the route is optimized from the condition in FIG. 7 to the condition in FIG. 4. Referring to FIG. 39, there is shown an operation procedure for starting a communication from the terminal 42 to the mobile terminal 41 used when the route is optimized from the condition in FIG. 8 to the condition in FIG. 5. These procedures are almost the same as those described by using FIGS. 27 to 29 and therefore the description is omitted here.

Next, a description is given below for a case where an Ipv4 mobile terminal initiates a communication with an Ipv6 terminal in a foreign network and then it moves with a route optimization.

Figure 9:
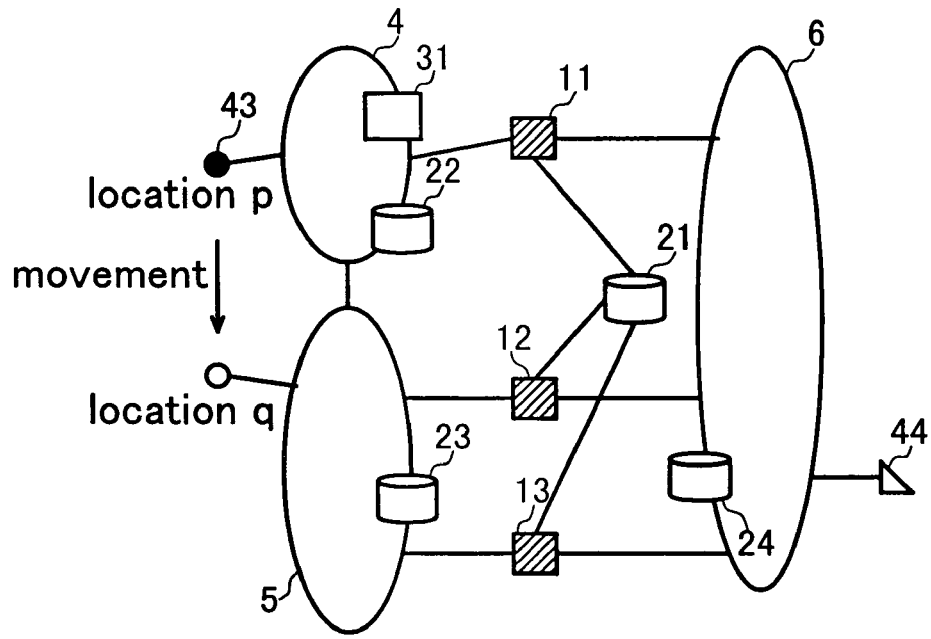
FIG. 9 is a diagram of assistance in explaining a configuration of another network in which the IPv4 network is connected to the IPv6 network.

Referring to FIG. 9, there is shown a diagram of assistance in explaining a configuration of a network in which IPv4 networks 4 and are connected to an IPv6 network 6. The network 4 is a home network of the IPv4 mobile terminal 43 and the network 5 is a foreign network of the mobile terminal 43. Others are configured in the same manner as for one in FIG. 1.

Figure 10:
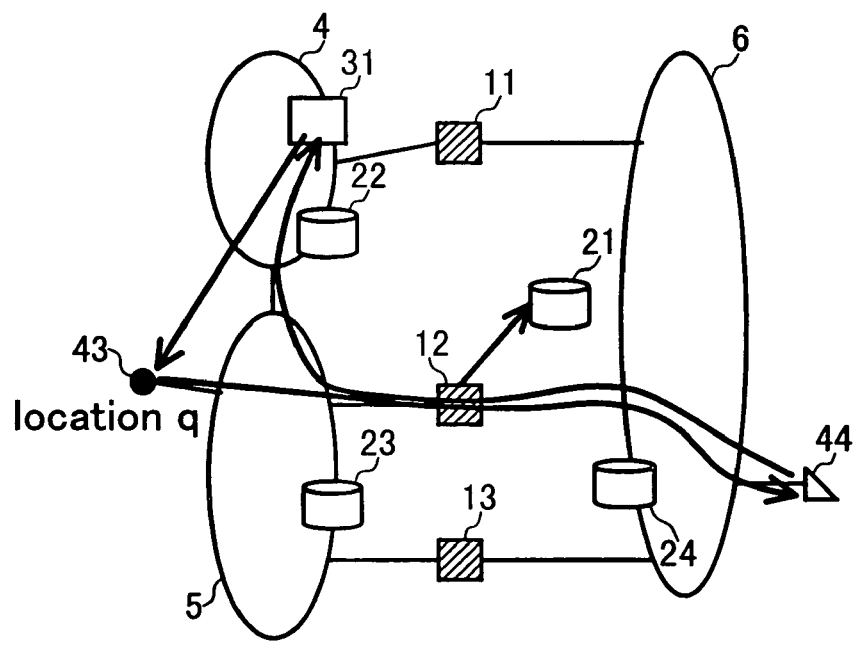
FIG. 10 is a diagram of assistance in explaining a communication route selected if the IPv4 mobile terminal initiates a communication in a foreign network.
Figure 11:
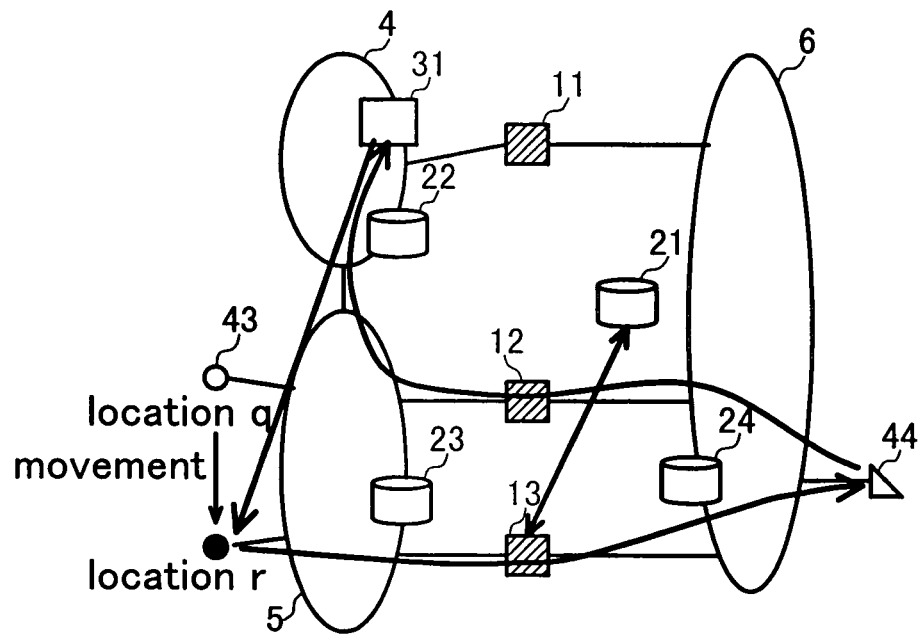
FIG. 11 is a diagram of assistance in explaining a communication route selected if the IPv4 mobile terminal moves from the location in FIG. 10.
Figure 12:
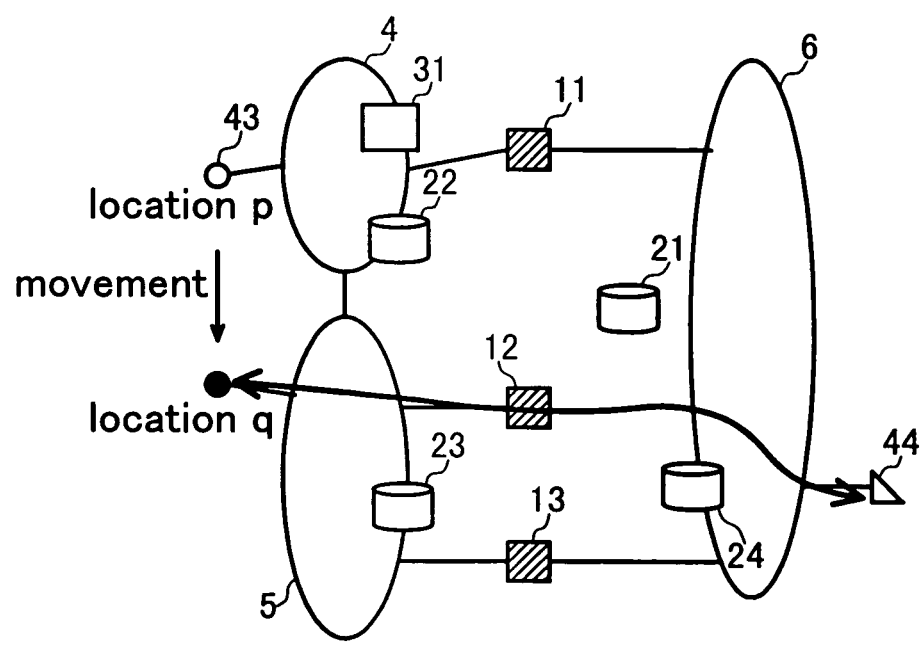
FIG. 12 is a diagram of assistance in explaining a communication route selected if the IPv4 mobile terminal moves from the home network to a foreign network and performs a route optimization or if the IPv4 mobile terminal initiates a communication in the foreign network and then performs a route optimization.
Figure 13:
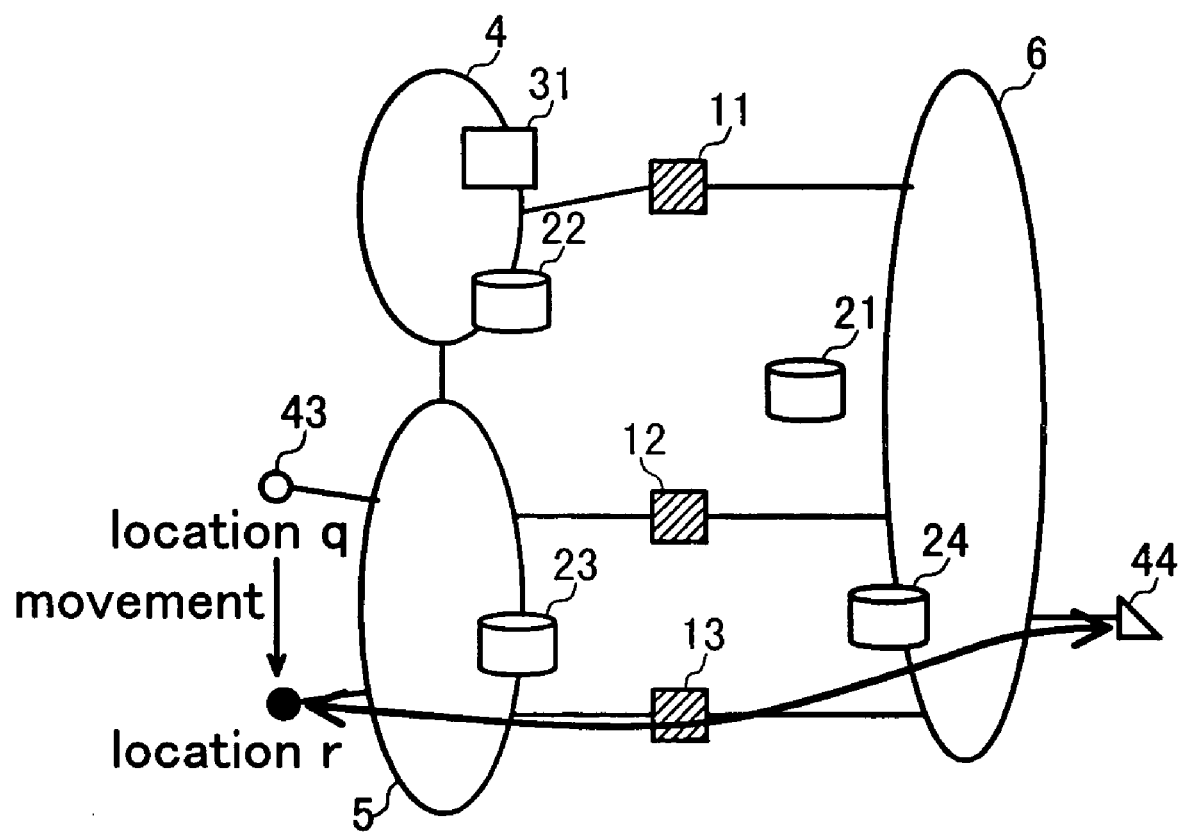
FIG. 13 is a diagram of assistance in explaining a communication route selected if the IPv4 mobile terminal further moves after the route optimization shown in FIG. 12.

Referring to FIG. 10, there is shown a communication route selected if an IPv4 mobile terminal 43 in the position q initiates a communication with an IPv6 terminal 44. Referring to FIG. 11, there is shown a communication route selected if the terminal 43 moves from the position q to the position r. FIGS. 12 and 13 illustrate communication routes optimized in the conditions FIGS. 10 and 11, respectively. The route optimization process after starting the transmission from the terminal 41 in the foreign network to the terminal 42 is the same as the route optimization process performed when the terminal 41 moves from the home network 1 to the foreign network 2 and therefore FIG. 13 shows an example of the latter.

Figure 40:
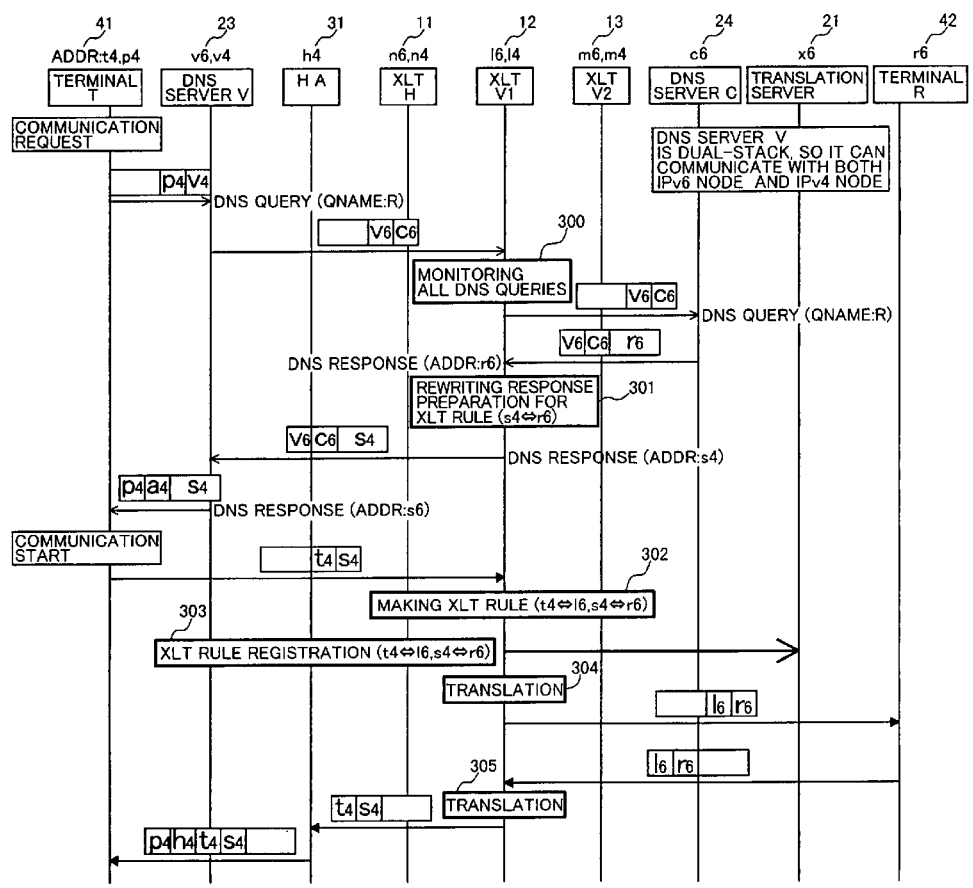
FIG. 40 is a sequence diagram in which the IPv4 mobile terminal in a foreign network initiates a communication.
Figure 41:
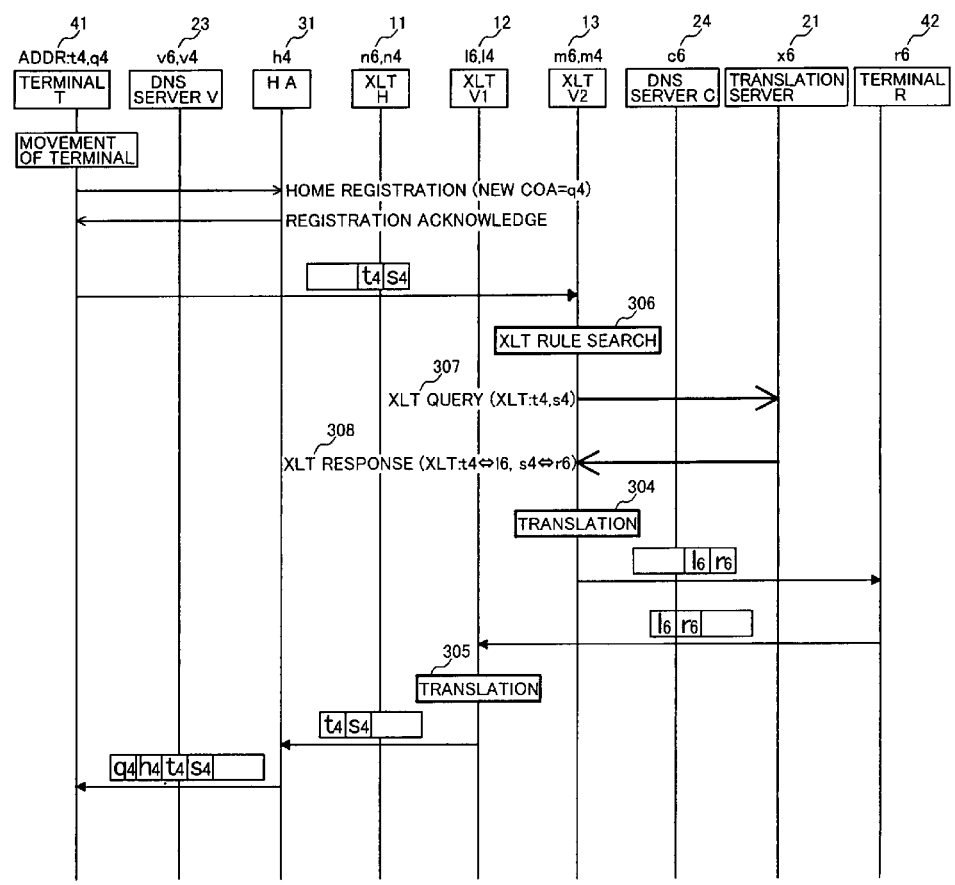
FIG. 41 is a sequence diagram in which the IPv4 mobile terminal moves after an end of the procedure shown in FIG. 40.
Figure 42:
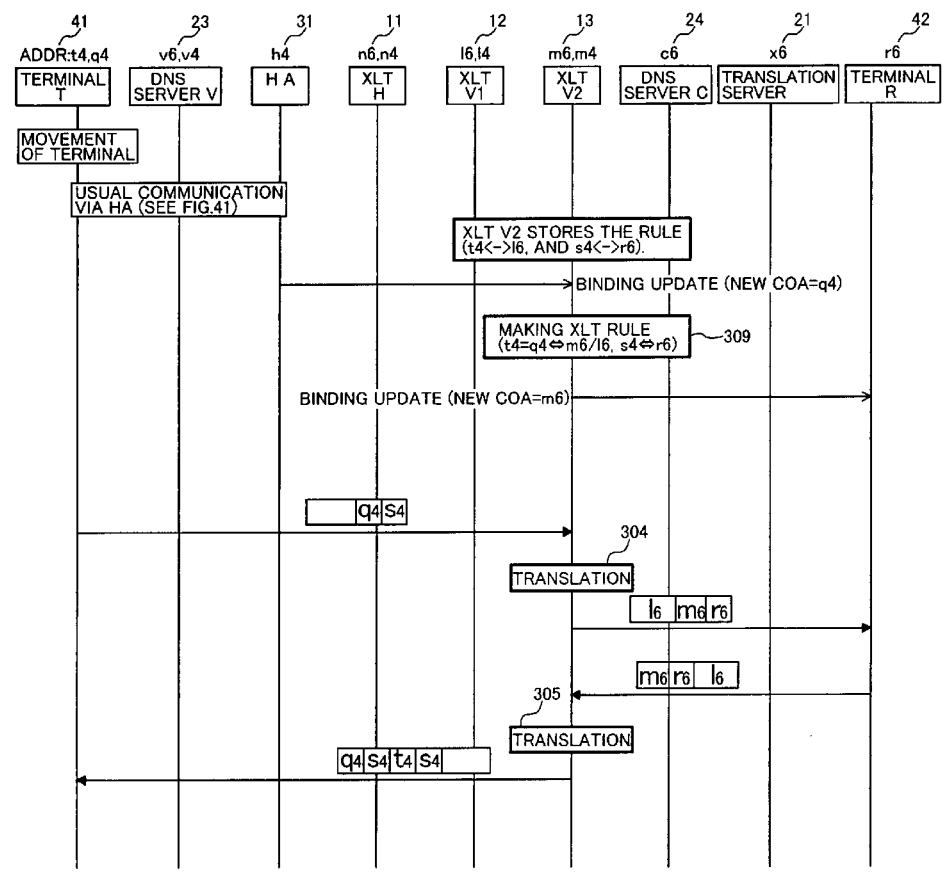
FIG. 42 is a sequence diagram for a route optimization after an end of the procedure shown in FIG. 41.

Referring to FIGS. 40, 41, and 42, there are shown communication procedures used for communications through the communication routes shown in FIGS. 10, 11, and 13. Subsequently, FIGS. 40, 41, and 42 are described below.

Referring to FIG. 40, there is shown a procedure for the IPv4 mobile terminal in the foreign network communicating with the IPv6 terminal. It is quite the same as the procedure (FIG. 24) for the IPv6 mobile terminal communicating with the IPv4 terminal. Regarding the translation information, the IPv4 and IPv6 addresses are replaced with each other. In other words, the translator 12 allocates a virtual source IPv6 address to the source IPv4 address and a virtual destination IPv4 address to the destination IPv6 address.

Referring to FIG. 41, there is shown a procedure used when the IPv4 mobile terminal moves after the completion of the procedure shown in FIG. 40. It is also the same as one for the IPv6 mobile terminal (FIG. 25) except that the addresses IPv4 and IPv6 are replaced with each other as addresses in the translation information.

Referring to FIG. 42, there is shown a procedure for performing a route optimization after the procedure in FIG. 41. It differs from the procedure for the IPv6 mobile terminal in that the position registration for the route optimization is performed not by the mobile terminal, but by the home agent. Accordingly, though the difference has no concern with a communication with the mobile terminal, when the translator 13 generates translation information in the sequence 310 in FIG. 42, translation information for the home agent is also required as well as translation information of the mobile terminal and therefore they are generated simultaneously. Others are the same as for the IPv6 mobile terminal.

Figure 14:
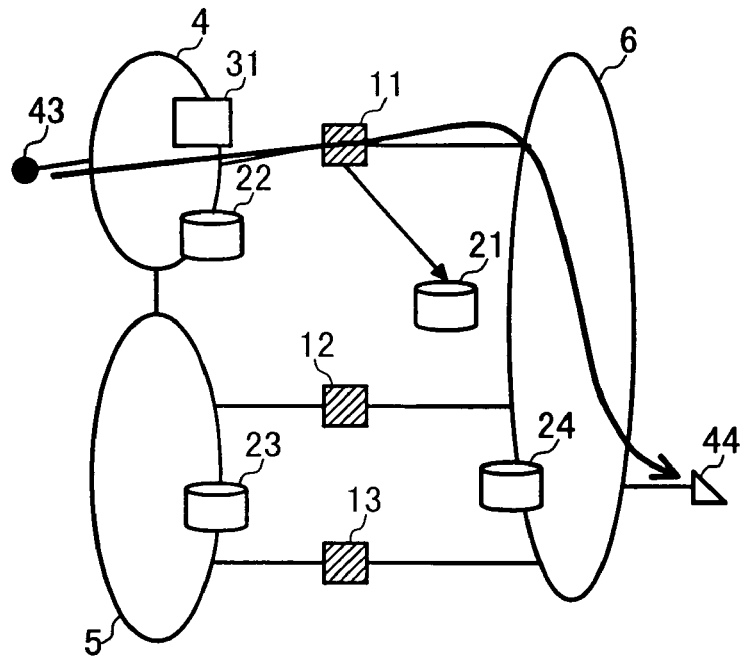
FIG. 14 is a diagram of assistance in explaining a communication route selected if the IPv4 mobile terminal initiates a communication in the home network.
Figure 15:
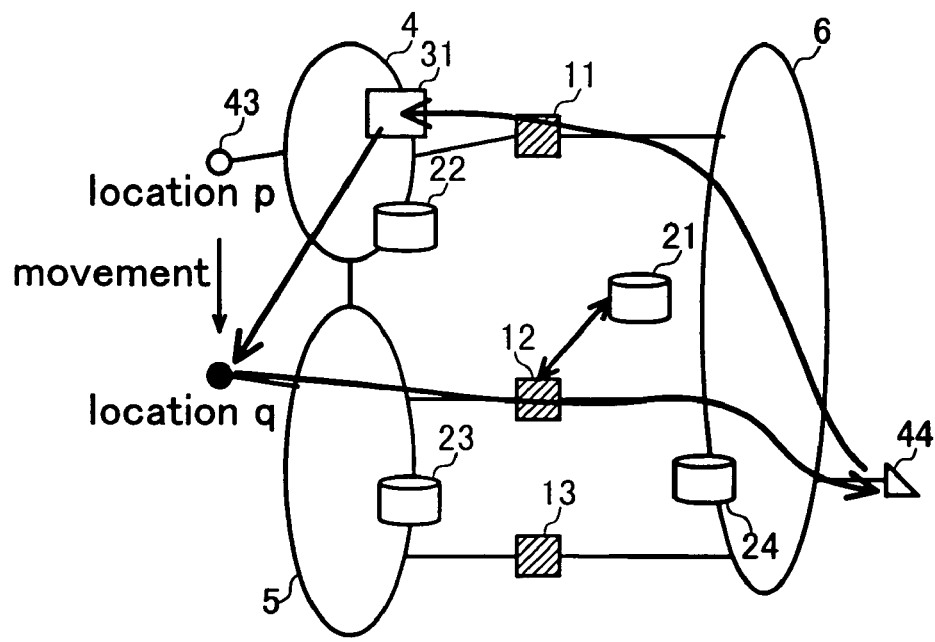
FIG. 15 is a diagram of assistance in explaining a communication route selected if the IPv4 mobile terminal moves from the home network to the foreign network.
Figure 16:
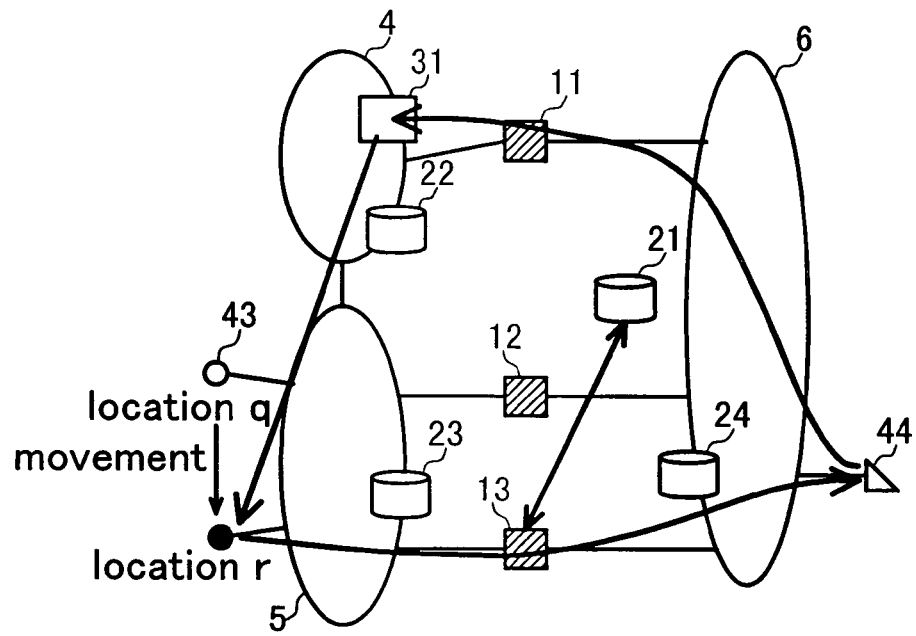
FIG. 16 is a diagram of assistance in explaining a communication route selected if the IPv4 mobile terminal further moves from the location shown in FIG. 15.
Figure 17:
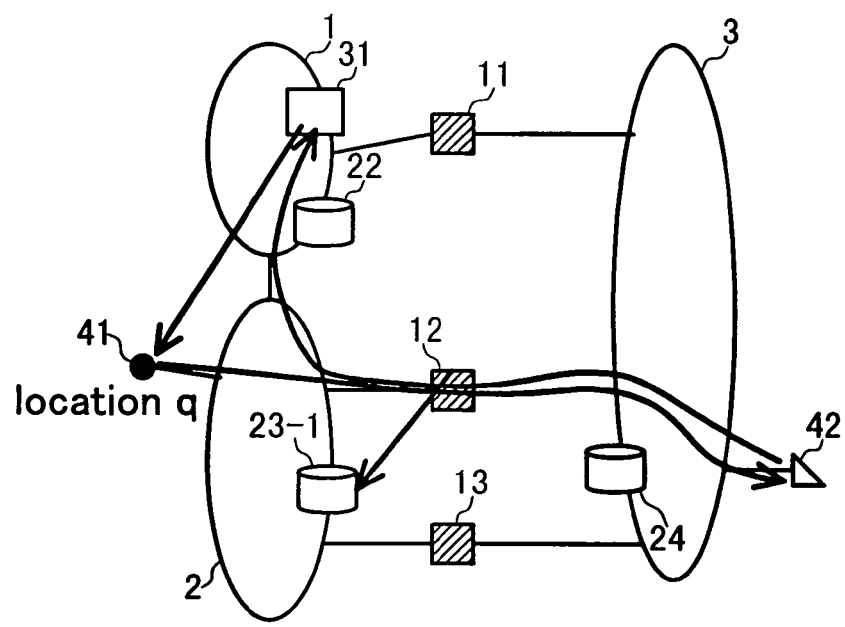
FIG. 17 is a diagram of assistance in explaining a communication route selected if the IPv6 mobile terminal initiates a communication in a foreign network while using a DNS server incorporated translation server.
Figure 18:
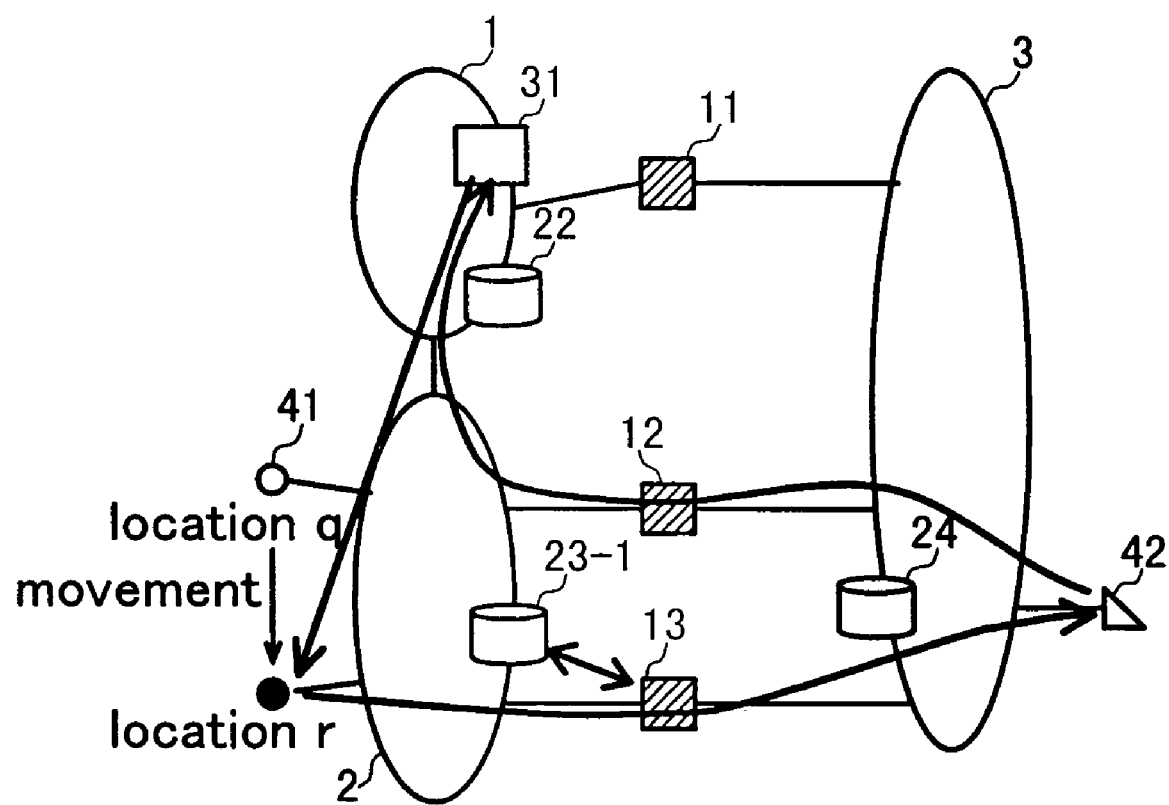
FIG. 18 is a diagram of assistance in explaining a communication route selected if the IPv6 mobile terminal moves from the location shown in FIG. 17.

Referring to FIG. 14, there is shown a communication route selected when the mobile terminal 43 makes a communication in the home network 4. If the mobile terminal 43 moves to a foreign network 5 in this status, a communication route as shown in FIG. 15 is selected after the movement according to a translation method of the present invention. If the route is optimized in this status, the route is selected as shown FIG. 12. If the terminal 43 moves further, the communication route is selected as shown in FIG. 16. If the route is optimized in the status, the communication route is selected as shown in FIG. 13. These procedures are the same as those described by using FIGS. 24 to 26.

Next, there is described an embodiment in which a translation server contains a DNS server function serving as a phone directory (large scale distributed database) in the Internet.

Figure 21:
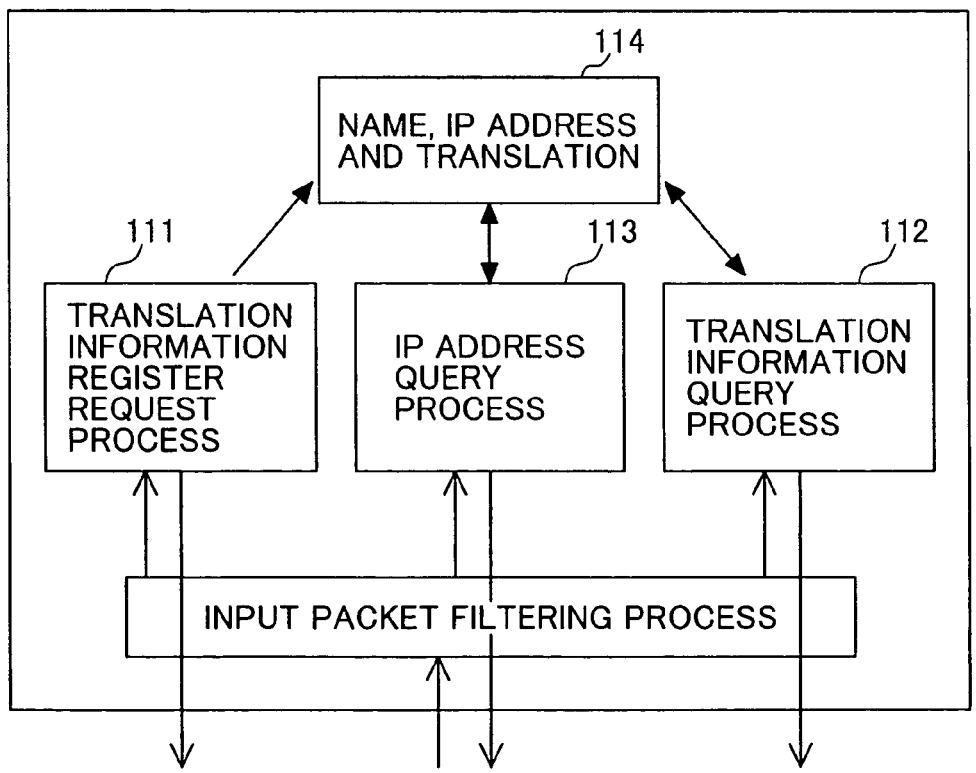
FIG. 21 is a block diagram of assistance in explaining an embodiment of a DNS server incorporated translation server according to the present invention.

Referring to FIG. 21, there is shown an embodiment of a DNS server incorporated translation server. FIG. 21 illustrates a functional block diagram of the DNS server incorporated translation server. The DNS server incorporated translation server has a processor, a storage device, and a communication controller for a connection to a network as hardware, though they are not shown. An input packet filtering process, a translation information register request process 111, a translation information query process 112, and an IP address query process 113 are made of software and executed by the processor. They can be made of hardware. A name, an IP address, and translation information 114 are retained in the storage device. In the input packet filtering process, input packets are distributed to the translation information register request process 111, the translation information query process 112, and the IP address query process 113. The translation information register request process 111 processes a translation information register request and stores the fetched translation information, name, and IP address into the translation information storage part 114. The IP address query process 113 processes a name resolving request of the DNS, searches names, IP addresses, and the translation information storage part 114 with the fetched name, and then transmits an acquired IP address to the request source. In addition, the translation information query process 112 processes the translation information query, searches names, IP addresses, and the translation information storage part 114 with the fetched virtual destination IP address or the like, and then transmits the acquired translation information to the request source.

Figure 43:
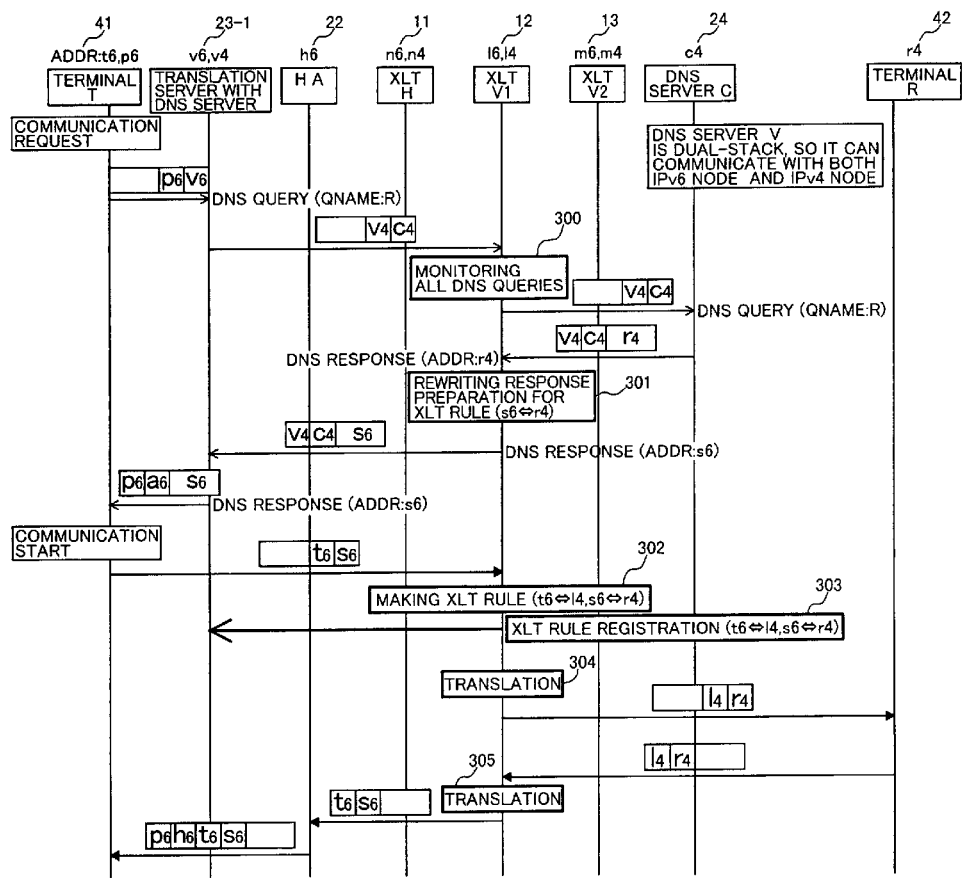
FIG. 43 is a sequence diagram in which the IPv6 mobile terminal in a foreign network initiates a communication while using a DNS server incorporated translation server.
Figure 44:
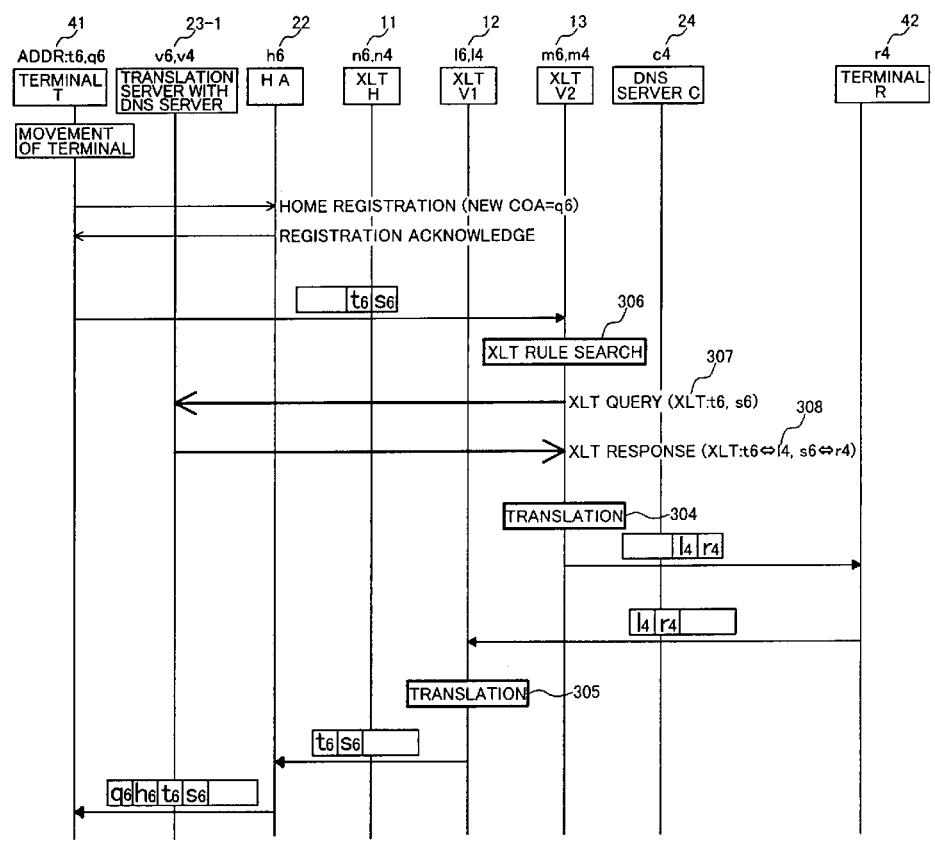
FIG. 44 is a sequence diagram in which the IPv6 mobile terminal moves after an end of the procedure shown in FIG. 43.
Figure 45:
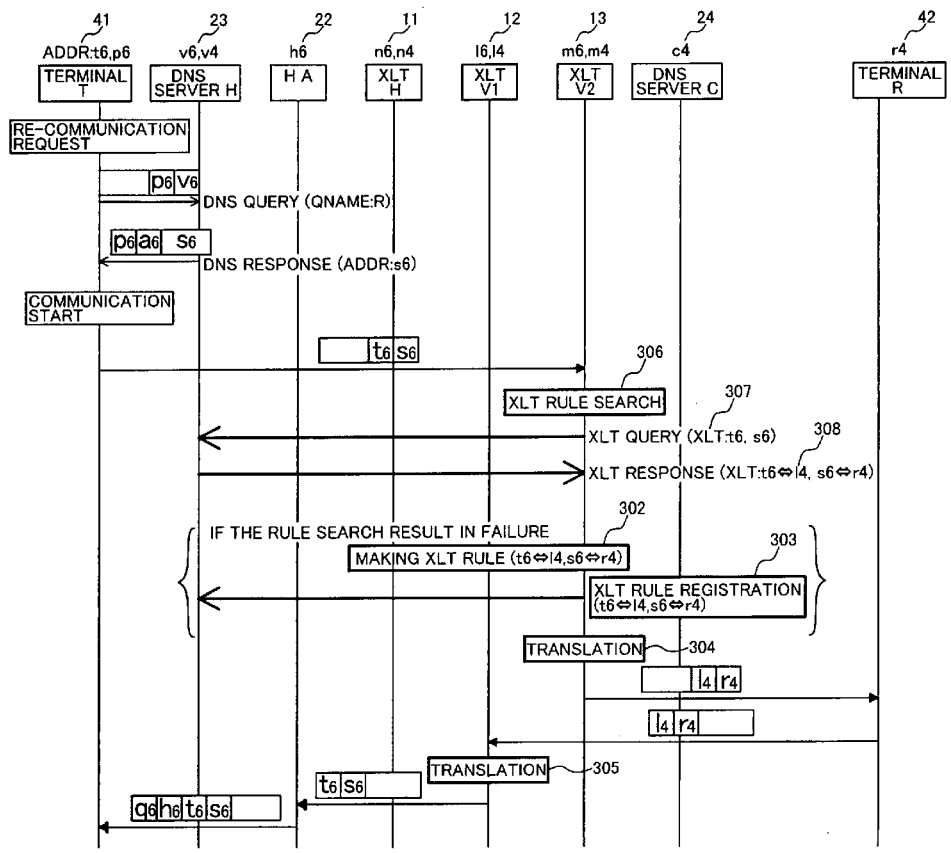
FIG. 45 is a sequence diagram in which the IPv6 mobile terminal initiates a new communication with the same destination after an end of the procedure shown in FIG. 44.

Referring to FIG. 43, there is shown a diagram of an operation procedure in which the IPv6 mobile terminal exists in a foreign network when using the DNS server incorporated translation server and initiates a communication.

Comparing FIG. 43 with an operation procedure using a normal translation server (FIG. 24), the DNS server incorporated server 23-1 is used instead of the translation server 21 and the DNS server 23 and therefore the DNS server incorporated translation server 23-1 is used for a destination of the translation information registration sequence 303. FIG. 23 shows an example of translation information of combined correspondences of the translation information, names, and IP addresses registered in this sequence and retained in the DNS server incorporated translation server 23-1 (#1 entry).

Generally in name resolving requiring a protocol translation, a DNS cache function is inhibited. In other words, in FIG. 34, the DNS server 23 always queries the DNS server 24 and it is inhibited to hold the result. It is because the intermediate translator 12 rewrites a DNS response and because identification is not assured between IP address rewriting information owned by the translator 12 and the cache IP address information retained in the DNS server 23.

On the other hand, the DNS server incorporated translation server 23-1 according to the present invention enables the DNS cache function by returning the virtual destination IPv6 address s6 to a name resolving request for a name R. It is possible because each translator always registers new translation information at the DNS server incorporated translation information server 23-1 when generating the new translation information and therefore any change of the translation information always updates the translation information in the DNS server incorporated translation information server 23-1 and because a lifetime of the translation information can be managed and therefore translation information discarded by each translator can also be discarded in the DNS server incorporated translation server 23-1. Thereby an IP address for a certain name R is a certain virtual destination IP address until the lifetime of the translation information ends up and the translation information is discarded.

In addition, an address for a name is returned in the same manner as for a normal DNS server for a name not requiring a protocol translation (an empty virtual address field) and a destination IP address and a virtual source IP address are returned for a query of translation information after searching for those with a virtual destination IP address and a source IP address.

As set forth hereinabove, the DNS server incorporated translation information server 23-1 can realize functions of both the DNS server and the translation server.

According to the above embodiments, a mobile terminal can continue a communication even after moving while translating protocols independently of whether it is an IPv4 or IPv6 mobile terminal. In addition, the mobile terminal can continue the communication even after moving while translating protocols both in originating and receiving a call. Furthermore, the mobile terminal can continue the communication even after moving while translating protocols in both cases in which the mobile terminal is located in the home network and in which it is in a foreign network. Still further, even after a route optimization with a linkage with the Mobile IP, the mobile terminal can continue the communication after moving while translating protocols.

Additionally, even if a DNS server is used as a translation server or if a protocol translation is necessary, the DNS cache function is available.

What is claimed is:

1. A translator connected to a first network for transferring data in a first protocol and a second network for transferring data in a second protocol, the translator connected to a translation server connected to the first network and the second network and a third network for transferring data in the first protocol, and to a first terminal which has moved from the third network to the first network, and to a second terminal in the second network, the translation server being connected to another translator, which is connected to the second network and the third network, comprising:

an interface for receiving a packet from the first terminal according to the first protocol, and sending the packet to the second terminal according to the second protocol, wherein the translator sends a translation informing query to the translation server upon receiving the packet from the first terminal, receives translation information from the translation server, updates an address of the first terminal in the translation information using a source address in the packet, and translates a destination address of the packet according to the translation information before sending the packet to the second terminal, the translation information in the translation server is sent from said another translator, and the translation information is exchanged between the translator and said another translator via the translation server.

2. The translator according to claim 1, wherein the first terminal is connected to a home agent, and the first terminal sends the packet to the translator after sending a care of address used in the first network to the home agent.

3. The translator according to claim 1, where the translation information includes a corresponding association between a real address of the first terminal using the first protocol, a virtual address of the first terminal using the second protocol, a real address of the second terminal using the second protocol, and a virtual address of the second terminal using the first protocol.

4. The translator according to claim 1, wherein the translation informing query includes a virtual address of the second terminal in the first protocol and a real address of the first terminal before the first terminal moved from the third network to the first network, and wherein the translation information received from the translation server is searched by the translation server based on said virtual address of the second terminal in the first protocol and the real address of the first terminal before the first terminal moved from the third network to the first network.

5. The translator according to claim 1, wherein the translation server updates a real address of the first terminal in the first protocol into a care-of address of the first terminal after the first terminal has moved from the third network to the first network, and the translator translates the destination address and the source address of the packet received from the first terminal based on the updated translation information.

6. The translator according to claim 5, wherein the translation server updates a virtual address of the first terminal in the second protocol into a new address of the second protocol, and the translator translates the destination address and the source address of the packet received from the first terminal are translated based on the updated translation information.

7. A translator connected to a first network for transferring data in a first protocol and a second network for transferring data in a second protocol, the translator connected to a translation server connected to the first network and the second, and to a first terminal which has moved within the first network, and to a second terminal in the second network, the translation server being connected to another translator, which is connected to the second network and the third network, comprising;

an interface for receiving a packet from the first terminal, and sending the packet to the second terminal; wherein the translator sends a translation information query to the translation server upon receiving the packet from the first terminal, and receives translation information from the translation server, updates an address in the translation information using a source address in the packet, and translates a destination address of the packet according to the translation information before sending the packet to the second terminal, the translation information in the translation server is sent from said another translator, and the translator does not exchange the translation information directly with said another translator.

8. The translator according to claim 7, wherein the first terminal is connected to a home agent, and the first terminal sends the packet to the translator after sending a care of address used after the movement to the home agent.

* * * * *